(12) United States Patent
Koga

(10) Patent No.: US 11,621,783 B2
(45) Date of Patent: Apr. 4, 2023

(54) OPTICAL RECEIVER AND RECEIVING METHOD

(71) Applicant: NEC Corporation, Tokyo (JP)

(72) Inventor: Tadashi Koga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/273,547

(22) PCT Filed: Sep. 4, 2019

(86) PCT No.: PCT/JP2019/034720
§ 371 (c)(1),
(2) Date: Mar. 4, 2021

(87) PCT Pub. No.: WO2020/050299
PCT Pub. Date: Mar. 12, 2020

(65) Prior Publication Data
US 2021/0203421 A1    Jul. 1, 2021

(30) Foreign Application Priority Data
Sep. 7, 2018  (JP) .............................. JP2018-167935

(51) Int. Cl.
*H04B 10/61*       (2013.01)
*H04J 14/06*       (2006.01)
*H04B 10/63*       (2013.01)

(52) U.S. Cl.
CPC ....... *H04B 10/6165* (2013.01); *H04B 10/614* (2013.01); *H04B 10/6151* (2013.01); *H04B 10/63* (2013.01); *H04J 14/06* (2013.01)

(58) Field of Classification Search
CPC ............ H04B 10/61–65; H04B 10/614; H04B 10/6151; H04B 10/6165; H04B 10/63; H04J 14/06

(Continued)

(56) References Cited

U.S. PATENT DOCUMENTS 4,706,300 A  *  11/1987  Minemura ................ G01J 9/04
                                                      398/204
5,052,051 A  *   9/1991  Naito ................... H04B 10/614
                                                      398/204

(Continued)

FOREIGN PATENT DOCUMENTS

JP    S61-153616 A    7/1986
JP    H02-110524      4/1990

(Continued)

OTHER PUBLICATIONS

International Search Report for PCT Application No. PCT/JP2019/034720, dated Oct. 8, 2019.

(Continued)

*Primary Examiner* — Li Liu
(74) *Attorney, Agent, or Firm* — Sughrue Mion, PLLC

(57) ABSTRACT

A local oscillation light output unit; a phase adjustment unit; a polarization control unit; a multiplexing unit; a photoelectric conversion unit; a demodulation unit; and a control unit. The phase adjustment unit adjusts the phase of local oscillation light. The polarization control unit controls polarization rotation of an optical signal. The multiplexing unit multiplexes the local oscillation light output from the phase adjustment unit with the optical signal output from the polarization control unit. The demodulation unit performs a demodulation process based on an electric signal obtained through conversion performed by the photoelectric conversion unit. The control unit, on the basis of information about the reception status of the optical signal, controls the execution of at least one of the phase adjustment of the local oscillation light in the phase adjustment unit and the polarization rotation of the optical signal in the polarization control unit.

20 Claims, 36 Drawing Sheets

(58) Field of Classification Search
USPC .................................................. 398/202–214
See application file for complete search history.

(56) References Cited

U.S. PATENT DOCUMENTS

| | | | | | |
|---|---|---|---|---|---|
| 5,323,258 | A | * | 6/1994 | Tsushima | H04B 10/614 398/205 |
| 9,419,724 | B2 | * | 8/2016 | Shibutani | H04B 10/616 |
| 9,722,697 | B2 | * | 8/2017 | Ogasahara | H04B 10/614 |
| 9,871,615 | B2 | * | 1/2018 | Bianciotto | H04L 7/0079 |
| 2012/0141130 | A1 | * | 6/2012 | Nakashima | H04B 10/505 398/82 |
| 2012/0263456 | A1 | * | 10/2012 | Tanaka | H04B 10/5055 398/25 |
| 2012/0280844 | A1 | * | 11/2012 | Abe | H04B 10/695 341/118 |
| 2013/0034354 | A1 | * | 2/2013 | Okamoto | H04B 10/69 398/65 |
| 2014/0044434 | A1 | * | 2/2014 | Hashimoto | H04B 10/118 398/125 |
| 2014/0086582 | A1 | * | 3/2014 | Iwano | H04B 10/61 398/48 |
| 2016/0164624 | A1 | * | 6/2016 | Yamauchi | H04J 14/06 398/34 |
| 2017/0117969 | A1 | * | 4/2017 | Fludger | H04B 10/6164 |
| 2017/0222716 | A1 | * | 8/2017 | Nakashima | H04B 10/0795 |
| 2020/0195354 | A1 | * | 6/2020 | Perin | H04B 10/6151 |
| 2021/0036774 | A1 | * | 2/2021 | Muraki | H04B 10/5161 |

FOREIGN PATENT DOCUMENTS

| | | |
|---|---|---|
| JP | H04-144320 A | 5/1992 |
| JP | 2013-034065 A | 2/2013 |
| JP | 2013-081227 | 5/2013 |
| JP | 2015-170916 A | 9/2015 |

OTHER PUBLICATIONS

English translation of Written opinion for PCT Application No. PCT/JP2019/034720, dated Oct. 8, 2019.
Japanese Office Communication for JP Application No. 2020-541258 dated Sep. 6, 2022 with English Translation.

* cited by examiner

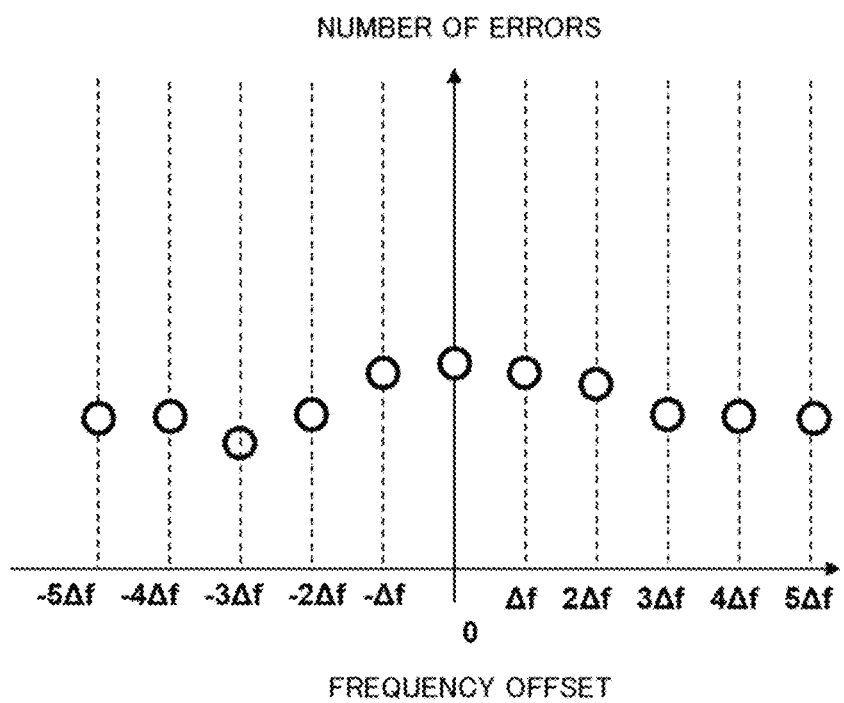

Fig. 7

OPUk payload (4 x 3808 bytes)

ODUk overhead
OPUk overhead

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | Frame Alignment overhead | | | | | OTUk overhead | | | | | | | |
| 2 | RES | | TCM6 | | | | | TCM1 | TCM5 | | PM | | TCM4 | EXP | | |
| 3 | TCM3 | | TCM2 | | | | | | | | RES | | | | | |
| 4 | GCC1 | | GCC2 | | | | APS/PCC | | | | | | | | | |

PM and TCM
TCM ACT
FTFL

PM: Path monitoring, TCM: Tandem connection monitoring,
PM and TCM: Path monitoring and Tandem connection monitoring,
RES: Reserved for future international standardization,
ACT: Activation / deactivation control channel,
FTFL: Fault type and fault location reporting channel,
EXP: Experimental, GCC: General communication channel,
APS: Automatic protection switching coordination channel,
PCC: Protection communication control channel

BPSK

IN THE PRESENCE OF FREQUENCY OFFSET

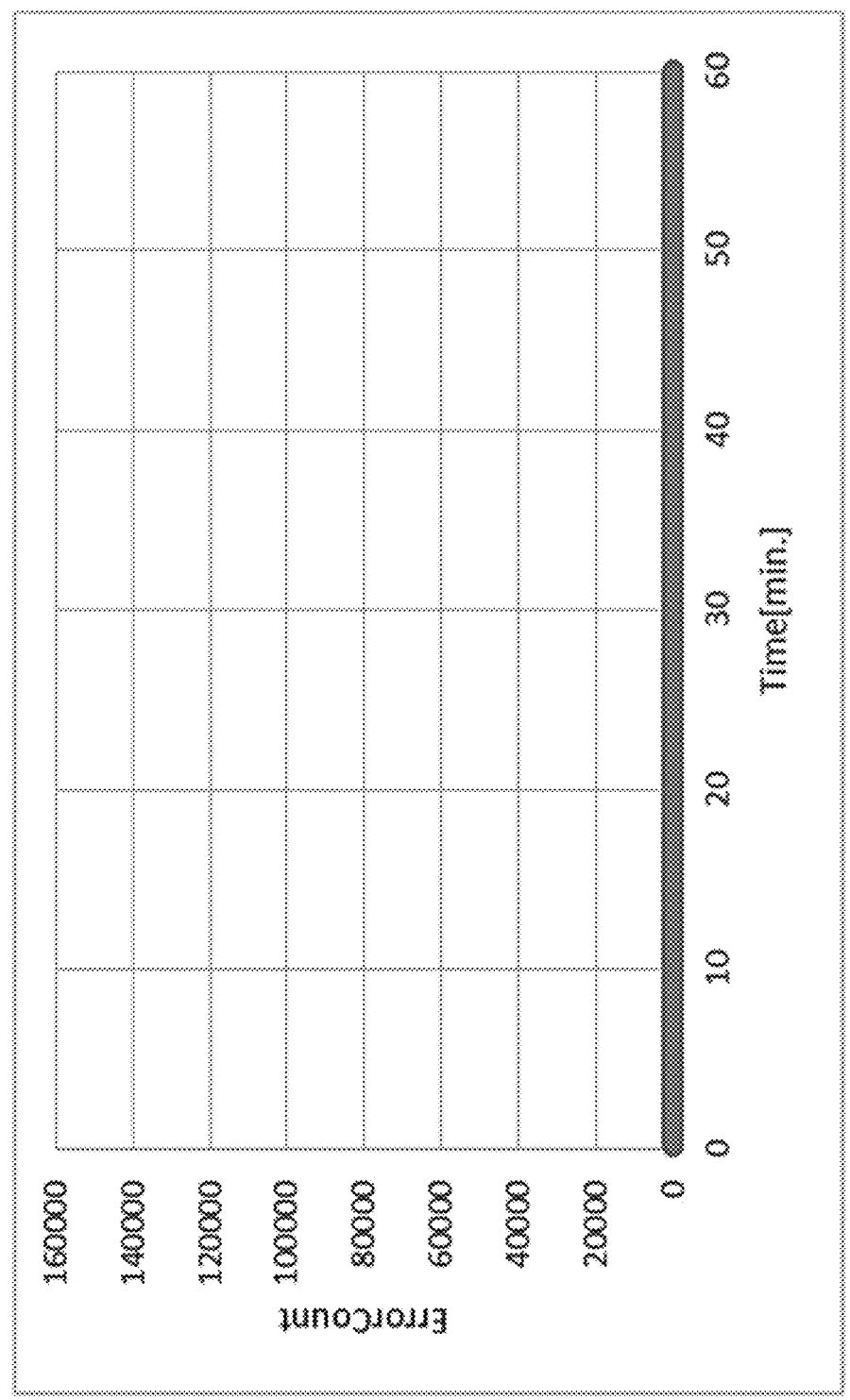

OPTICAL RECEIVER AND RECEIVING METHOD

This application is a National Stage Entry of PCT/JP2019/034720 filed on Sep. 4, 2019, which claims priority from Japanese Patent Application 2018-167935 filed on Sep. 7, 2018, the contents of all of which are incorporated herein by reference, in their entirety.

TECHNICAL FIELD

The present invention relates to an optical communication technique based on a digital coherent method, and more specifically relates to a technique for maintaining reception quality.

BACKGROUND ART

As an optical communication technique enabling large-capacity transmission at high speed, a digital coherent optical communication method is used. As the digital coherent optical communication method, various modulation methods such as a polarization multiplexing method and a multi-value modulation method have been proposed. As the multi-value modulation method, binary phase shift keying (BPSK), quadrature phase shift keying (QPSK), 8-quadrature amplitude modulation (8-QAM), and the like are used.

In the digital coherent method, a received optical signal and output light (local oscillation light) from a local oscillator are multiplied, and thereby a baseband signal is generated. The baseband signal is subjected to analog/digital conversion and digital signal processing, and thereby an original transmission signal is regenerated. Therefore, in order to maintain reception quality, it is necessary to stably perform coherent detection for an optical signal. As such a technique for stably performing coherent detection for an optical signal and maintaining signal quality, for example, a technique as in PTL 1 is disclosed.

PTL 1 relates to an optical transmitter based on a digital coherent method. The optical transmitter in PTL 1 adjusts a wavelength and power of local oscillation light in such a way as to increase signal quality of a reception signal, and controls a wavelength of local oscillation light in such a way as to cause a wavelength difference between an optical signal and local oscillation light not to occur. PTL 1 assumes that, when such a configuration is constructed, highly-accurate reception performance for an optical signal can be achieved.

CITATION LIST

Patent Literature

[PTL 1] Japanese Unexamined Patent Application Publication No. 2015-170916

SUMMARY OF INVENTION

Technical Problem

However, the technique of PTL 1 is insufficient in the following point. When coherent detection is performed on a reception side, a symbol may be fixed in an in-phase (I) axis or a quadrature (Q) axis when an optical signal and local oscillation light are matched in frequency. When, in such a case, a gain is automatically controlled in such a way as to cause an output amplitude to be constant in a detection element for an optical signal, there is no input signal for a component in which a component being fixed in an axis is 0, and therefore a gain may be set to be large in such a way as to increase the output amplitude. When the gain is set to be large, noise of a signal increases and then quality degradation of a signal occurs. Therefore, the technique of PTL 1 is insufficient as a technique for maintaining reception quality enabling stable reception processing in an optical communication system based on a digital coherent method.

An object of the present invention is to provide, in order to solve the problem described above, an optical receiver capable of maintaining reception quality enabling stable reception processing.

Solution to Problem

In order to solve the problem described above, according to an optical receiver of the present example embodiment, the optical receiver includes: a local oscillation light output means; a phase adjustment means; a polarization control means; a multiplexing means; a photoelectric conversion means; a demodulation means; and a control means. The local oscillation light output means outputs local oscillation light of a frequency being set based on a frequency of an optical signal to be inputted. The phase adjustment means adjusts a phase of the local oscillation light. The polarization control means controls polarization rotation of the optical signal. The multiplexing means multiplexes the local oscillation light output from the phase adjustment means with the optical signal output from the polarization control means. The photoelectric conversion means converts the optical signal multiplexed by the multiplexing means into an electric signal. The demodulation means executes demodulation processing, based on the electric signal converted by the photoelectric conversion means. The control means controls, based on information on a reception status of the optical signal, execution of at least one of adjustment of a phase of the local oscillation light in the phase adjustment means and polarization rotation of the optical signal in the polarization control means.

A receiving method according to the present invention includes: outputting local oscillation light of a frequency being set based on a frequency of an optical signal to be inputted; and multiplexing the local oscillation light subjected to phase adjustment with the optical signal subjected to polarization rotation. The receiving method according to the present invention further includes: converting the multiplexed optical signal into an electric signal; and executing demodulation processing, based on the converted electric signal. The receiving method according to the present invention further includes: executing, based on information on a reception status of the optical signal, at least one of adjustment of a phase of the local oscillation light and polarization rotation of the optical signal.

Advantageous Effects of Invention

According to the present invention, it is possible to perform stable coherent detection on a reception side and maintain quality of a reception signal.

BRIEF DESCRIPTION OF DRAWINGS

FIG. 6 is a diagram illustrating an example of a measurement result of the number of errors with respect to each frequency offset according to the second example embodiment of the present invention.

FIG. 7 is a diagram illustrating an example of a frame being transmitted in an example of another configuration according to the second example embodiment of the present invention.

FIG. 34 is a diagram illustrating an example of a temporal change of the number of error occurrences in the optical receiver according to the eighth example embodiment of the present invention.

EXAMPLE EMBODIMENT

First Example Embodiment

Figure 1:
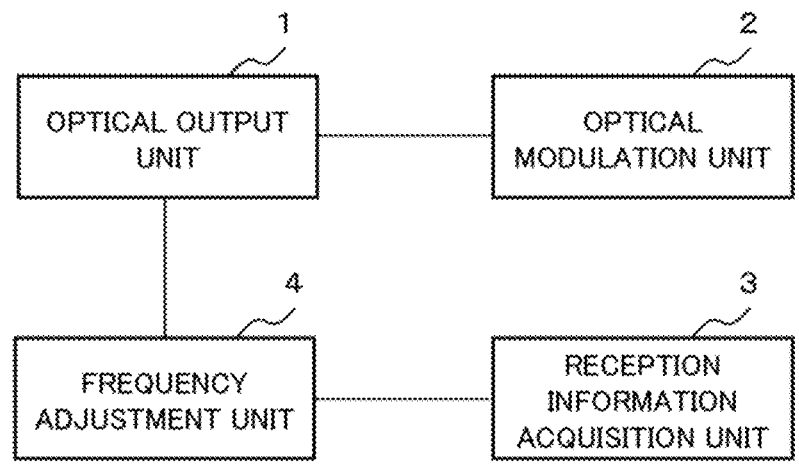
FIG. 1 is a diagram illustrating an outline of a configuration according to a first example embodiment of the present invention.

A first example embodiment of the present invention is described in detail with reference to a drawing. FIG. 1 illustrates an outline of a configuration of an optical transmitter according to the present example embodiment. The optical transmitter according to the present example embodiment includes an optical output unit 1, an optical modulation unit 2, a reception information acquisition unit 3, and a frequency adjustment unit 4. The optical output unit 1 outputs light of a frequency allocated to a local device. The optical modulation unit 2 separates light output by the optical output unit 1 into polarized waves orthogonal to each other, performs modulation each of the polarized waves to an in-phase component and a quadrature component, and outputs an optical signal in which component waves subjected to perform modulation are polarization-synthesized. The reception information acquisition unit 3 acquires information on a reception status of an optical signal in an optical receiver being a transmission destination of the optical signal. The frequency adjustment unit 4 controls, based on the information on the reception status, a frequency of light output by the optical output unit 1, and adjusts a frequency offset being a difference between a frequency of local oscillation light used when the optical receiver performs coherent detection for an optical signal and a frequency of light output by the optical output unit 1.

The optical transmitter according to the present example embodiment acquires, in the reception information acquisition unit 3, information on a reception status in an optical receiver, and adjusts, in the frequency adjustment unit 4, a frequency offset being a difference between a frequency of local oscillation light of the optical receiver and a frequency of light output by the optical output unit 1. In the optical transmitter according to the present example embodiment, an offset is added to a frequency of local oscillation light and a frequency of light output by the optical output unit 1, and thereby a component in which an output amplitude is 0 in a detection element for a signal of the optical receiver is not generated. Therefore, a state where noise is generated in a signal due to an attempt to increase a gain in the optical receiver can be prevented, and thereby reception quality can be maintained. As a result, when the optical transmitter according to the present example embodiment is used, quality of a reception signal can be maintained by performing stable coherent detection on a reception side.

Second Example Embodiment

Figure 2:
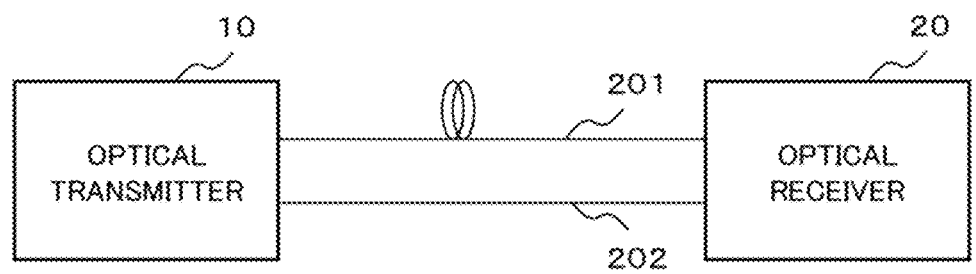
FIG. 2 is a diagram illustrating an outline of a configuration according to a second example embodiment of the present invention.

A second example embodiment of the present invention is described in detail with reference to drawings. FIG. 2 is a diagram illustrating an outline of a configuration of an optical communication system according to the present example embodiment. The optical communication system according to the present example embodiment includes an optical transmitter 10 and an optical receiver 20. The optical transmitter 10 and the optical receiver 20 are connected to each other via a communication path 201 and a communication path 202. The optical communication system according to the present example embodiment is a network system that performs optical communication based on a digital coherent method via the communication path 201 between the optical transmitter 10 and the optical receiver 20.

Figure 3:
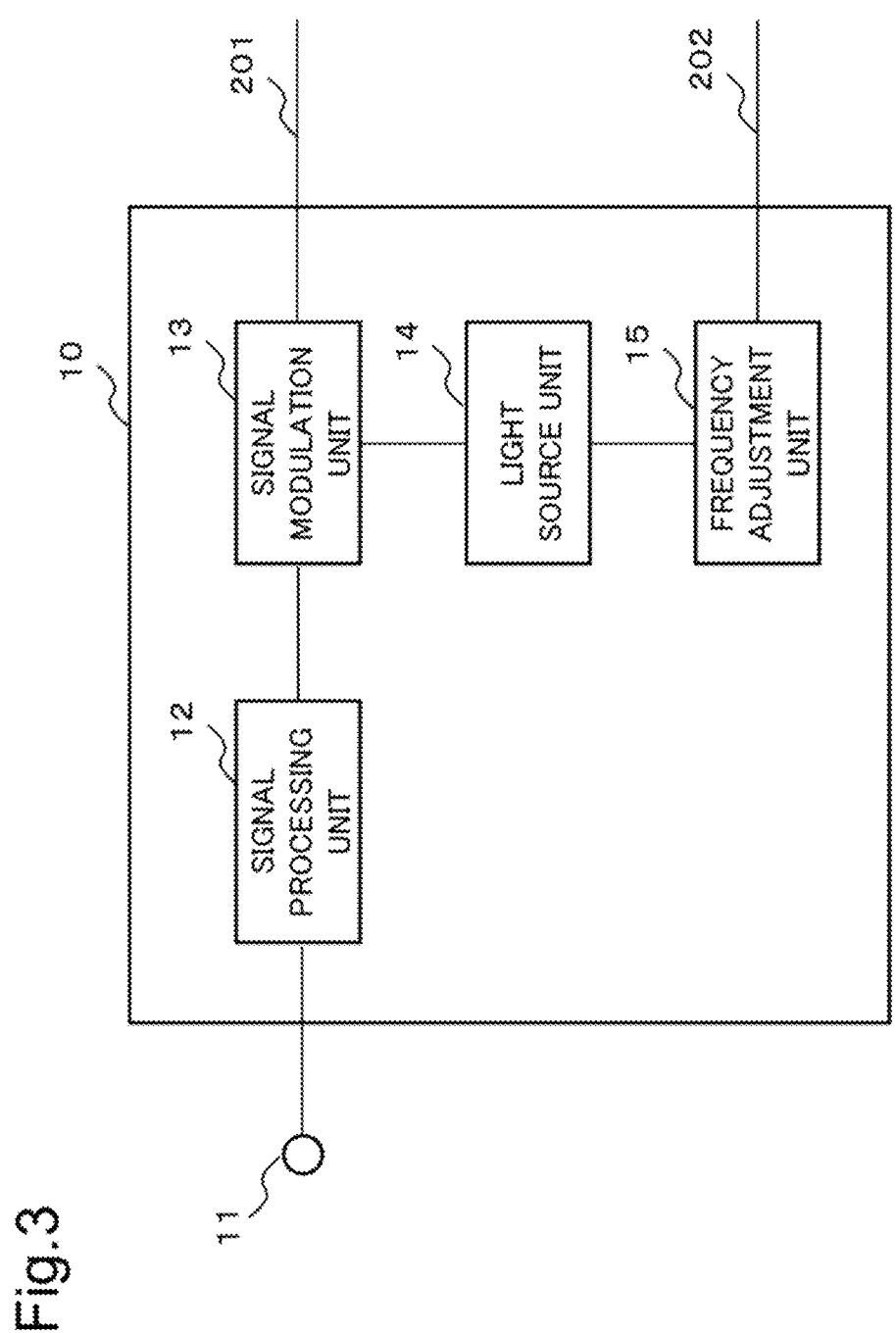
FIG. 3 is a diagram illustrating a configuration of an optical transmitter according to the second example embodiment of the present invention.

A configuration of the optical transmitter 10 is described. FIG. 3 illustrates a configuration of the optical transmitter 10 according to the present example embodiment. The optical transmitter 10 includes a client-signal input unit 11, a signal processing unit 12, a signal modulation unit 13, a light source unit 14, and a frequency adjustment unit 15.

The client-signal input unit 11 is an input port for a client signal transmitted via the communication path 201. A client signal input to the client-signal input unit 11 is transmitted to the signal processing unit 12.

The signal processing unit 12 executes processing such as redundancy for the input client signal, and maps the processed signal in a frame used when the signal is transmitted through the communication path 201.

The signal modulation unit 13 performs modulation, based on the signal input from the signal processing unit 12, light input from the light source unit 14, and generates an optical signal transmitted to the communication path 201.

The signal modulation unit 13 according to the present example embodiment performs modulation, for example, based on a binary phase shift keying (BPSK) modulation method. A modulation method may be another multi-value modulation method such as quadrature phase shift keying (QPSK) and 8-quadrature amplitude modulation (8-QAM) other than BPSK. A function of the signal modulation unit 13 according to the present example embodiment is equivalent to the optical modulation unit 2 according to the first example embodiment.

The light source unit 14 outputs continuous light of a predetermined frequency to the signal modulation unit 13. The predetermined frequency is allocated based on wavelength design of an optical communication network. The light source unit 14 outputs, by using a predetermined frequency as a set value, light of a frequency in which an offset is added to the set value. An offset amount of a frequency is controlled by the frequency adjustment unit 15. A function of the light source unit 14 according to the present example embodiment is equivalent to the optical output unit 1 according to the first example embodiment.

The frequency adjustment unit 15 controls an offset amount of a frequency of the light source unit 14. The frequency adjustment unit 15 controls, based on error information transmitted from the optical receiver 20, the offset amount of a frequency. The frequency adjustment unit 15 controls the offset amount of a frequency in such a way as to decrease a bit error rate (BER) transmitted as the error information. A function of the frequency adjustment unit 15 according to the present example embodiment is equivalent to the reception information acquisition unit 3 and the frequency adjustment unit 4 according to the first example embodiment.

Figure 4:
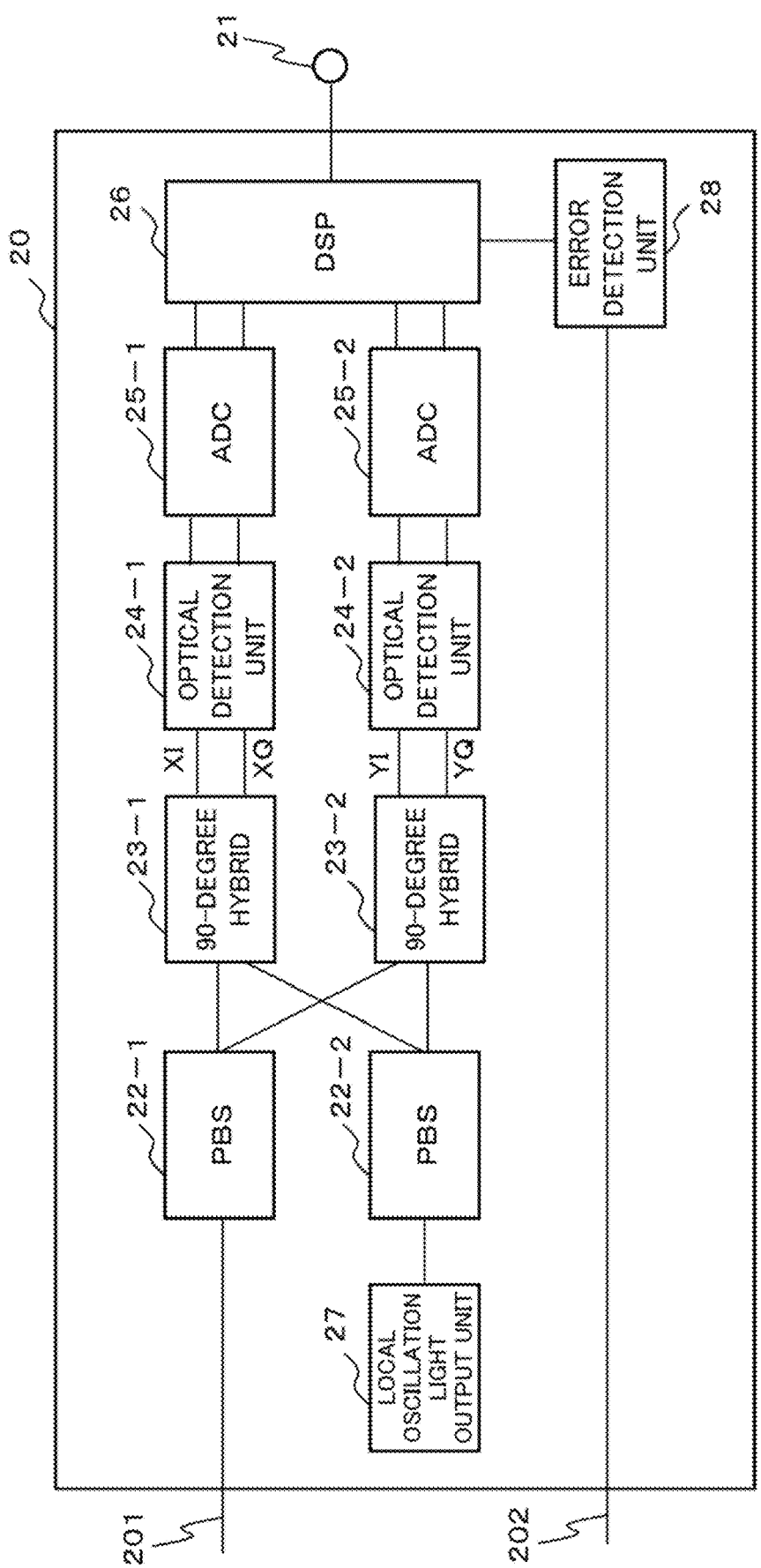
FIG. 4 is a diagram illustrating a configuration of an optical receiver according to the second example embodiment of the present invention.

A configuration of the optical receiver 20 is described. FIG. 4 illustrates a configuration of the optical receiver 20 according to the present example embodiment. The optical receiver 20 includes a client-signal output unit 21, a PBS 22, a 90-degree hybrid 23, and an optical detection unit 24. The optical receiver 20 further includes an analog to digital converter (ADC) 25, a digital signal processor (DSP) 26, a local oscillation light output unit 27, and an error detection unit 28.

The client-signal output unit 21 is an output port that outputs a demodulated client signal.

The polarizing beam splitter (PBS) 22 polarization-separates an input optical signal, and outputs the separated signals. The PBS 22 includes a PBS 22-1 that polarization-separates the optical signal and a PBS 22-2 that polarization-separates local oscillation light. The PBS 22-1 polarization-separates the optical signal input from the communication path 201, outputs an X-polarized wave to a 90-degree hybrid 23-1, and transmits a Y-polarized wave to a 90-degree hybrid 23-2. The PBS 22-2 polarization-separates light input from the local oscillation light output unit 27, outputs an X-polarized wave to the 90-degree hybrid 23-1, and transmits a Y-polarized wave to the 90-degree hybrid 23-2.

The 90-degree hybrid 23 multiplexes the input optical signal with the input local oscillation light through two paths different in phase by 90 degrees. The 90-degree hybrid 23-1 multiplexes an X-polarization component of the optical signal input from the PBS 22-1 with an X-polarization component of the local oscillation light input from the PBS 22-2 through two paths different in phase by 90 degrees.

The 90-degree hybrid 23-1 transmits, to an optical detection unit 24-1, signals of an in-phase (I-phase) component and a quadrature (Q-phase) component generated by multiplexing the optical signal with the local oscillation light through paths different in phase by 90 degrees. The 90-degree hybrid 23-2 multiplexes a Y-polarization component of the optical signal input from the PBS 22-1 with a Y-polarization component of the local oscillation light input from the PBS 22-2 through two paths different in phase by 90 degrees. The 90-degree hybrid 23-2 transmits, to an optical detection unit 24-2, signals of an I-phase component and a Q-phase component generated by multiplexing the optical signal with the local oscillation light through paths different in phase by 90 degrees.

The optical detection unit 24 converts the input optical signal to an electric signal, and outputs the electric signal. The optical detection unit 24 is configured by using a photodiode. The optical detection unit 24-1 converts the optical signal of each of the I-phase component and the Q-phase component of the X-polarized wave input from the 90-degree hybrid 23-1 to an electric signal, and transmits the electric signal to an ADC 25-1. The optical detection unit 24-2 converts the optical signal of each of the I-phase component and the Q-phase component of the Y-polarized wave input from the 90-degree hybrid 23-2 to electric signal, and transmits the electric signal to an ADC 25-2.

The ADC 25 converts an input analog signal to a digital signal. The ADC 25-1 converts an analog signal input from the optical detection unit 24-1 to a digital signal, and transmits the digital signal to the DSP 26. The ADC 25-2 converts an analog signal input from the optical detection unit 24-2 to a digital signal, and transmits the digital signal to the DSP 26.

The DSP 26 executes reception processing such as distortion correction, decoding and error correction for an input signal, and demodulates a client signal. The DSP 26 is configured by a semiconductor device. A reception processing function of the DSP 26 may be configured by using a field programmable gate array (FPGA). The reception processing function of the DSP 26 may be performed by causing a general-purpose processor such as a central processing unit (CPU) to execute a computer program. The DSP 26 transmits the demodulated client signal to the client-signal output unit 21.

The local oscillation light output unit 27 generates local oscillation light used when the light is multiplexed with an optical signal transmitted via the communication path 201 and an optical signal for performing coherent detection is generated. The local oscillation light output unit 27 includes a semiconductor laser, and outputs light of a frequency set based on a frequency of the optical signal transmitted via the communication path 201.

The error detection unit 28 monitors error correction processing in the DSP 26, and measures the number of errors. The error detection unit 28 according to the present example embodiment calculates a BER, based on the measured number of errors, and transmits, as error information, information on the calculated BER to the optical transmitter 10 via the communication path 202. The error detection unit 28 may be integrated with the DSP 26 as a part of the DSP 26.

The communication path 201 is configured as an optical communication network using an optical fiber. The communication path 201 transmits an optical signal in a direction of the optical receiver 20 from the optical transmitter 10. The communication path 202 is a communication network that transmits a control signal and the like from the optical receiver 20 to an optical transmitter. The communication path 202 is provided, for example, as a control line for devices based on a communication management system.

An operation of the optical communication system according to the present example embodiment is described. First, a client signal to be transmitted through the communication path 201 is input to the client-signal input unit 11. As a client signal, for example, a signal based on a synchronous optical network (SONET), Ethernet (a registered trademark), a fiber channel (FC), an optical transport network (OTN), and the like is used. The client signal input to the client-signal input unit 11 is transmitted to the signal processing unit 12.

When the client signal is input, the signal processing unit 12 maps the client signal in a frame used when the client signal is transmitted through the communication path 201. When the mapping is performed, the signal processing unit 12 transmits the mapped signal to the signal modulation unit 13.

When a signal based on data of a frame subjected to mapping is input, the signal modulation unit 13 performs modulation, based on the data of the frame input from the signal processing unit 12, light output from the light source unit 14. The signal modulation unit 13 performs, by using a BPSK method, conversion from an electric signal to an optical signal. The signal modulation unit 13 transmits the optical signal generated by performing modulation to the communication path 201.

The optical signal transmitted to the communication path 201 is transmitted through the communication path 201, and is transmitted to the optical receiver 20. The optical signal received in the optical receiver 20 is input to the PBS 22-1. When the optical signal is input, the PBS 22-1 polarization-separates the input optical signal, transmits an X-polarization optical signal to the 90-degree hybrid 23-1, and transmits a Y-polarization optical signal to the 90-degree hybrid 23-2.

When the optical signal is input from the PBS 22-1, the 90-degree hybrid 23-1 and the 90-degree hybrid 23-2 multiplex the optical signal input from the PBS 22-1 with local oscillation light input from the PBS 22-2, and generate signals relevant to an I-phase component and a Q-phase component. The 90-degree hybrid 23-1 and the 90-degree hybrid 23-2 transmit the generated optical signals to the optical detection unit 24-1 and the optical detection unit 24-2.

When the optical singles are input, the optical detection unit 24-1 and the optical detection unit 24-2 convert the input optical signal to an electric signal, and transmit the electric signal to the ADC 25-1 and the ADC 25-2. When the electric signal converted from the optical signal is input, the ADC 25-1 and the ADC 25-2 convert the input signal to a digital signal, and transmit the digital signal to the DSP 26.

When the signals are input to the DSP 26, the DSP 26 executes reception processing for the input signal, demodulates a client signal, and transmits the demodulated client signal to the client-signal output unit 21. The client-signal output unit 21 outputs the input client signal to a communication network or a communication device.

While the reception processing is executed in the DSP 26, the error detection unit 28 monitors error correction processing in the DSP 26 and measures the number of errors of the received signal. The error detection unit 28 according to the present example embodiment calculates the number of errors as a BER. The error detection unit 28 transmits, when calculating the BER, information on the calculated BER to the optical transmitter 10 as error information via the communication path 202.

The error information received by the optical transmitter 10 via the communication path 202 is transmitted to the frequency adjustment unit 15. The frequency adjustment unit 15 adjusts, when receiving the error information, a frequency offset of the light source unit 14 in such a way as to decrease a value of the BER. The frequency adjustment unit 15 changes, based on a change in the BER, an offset amount of a frequency, and controls the offset amount of the frequency in such a way as to minimize the BER. The light source unit 14 outputs light of a frequency in which an offset amount is corrected to the signal modulation unit 13.

Figure 5:
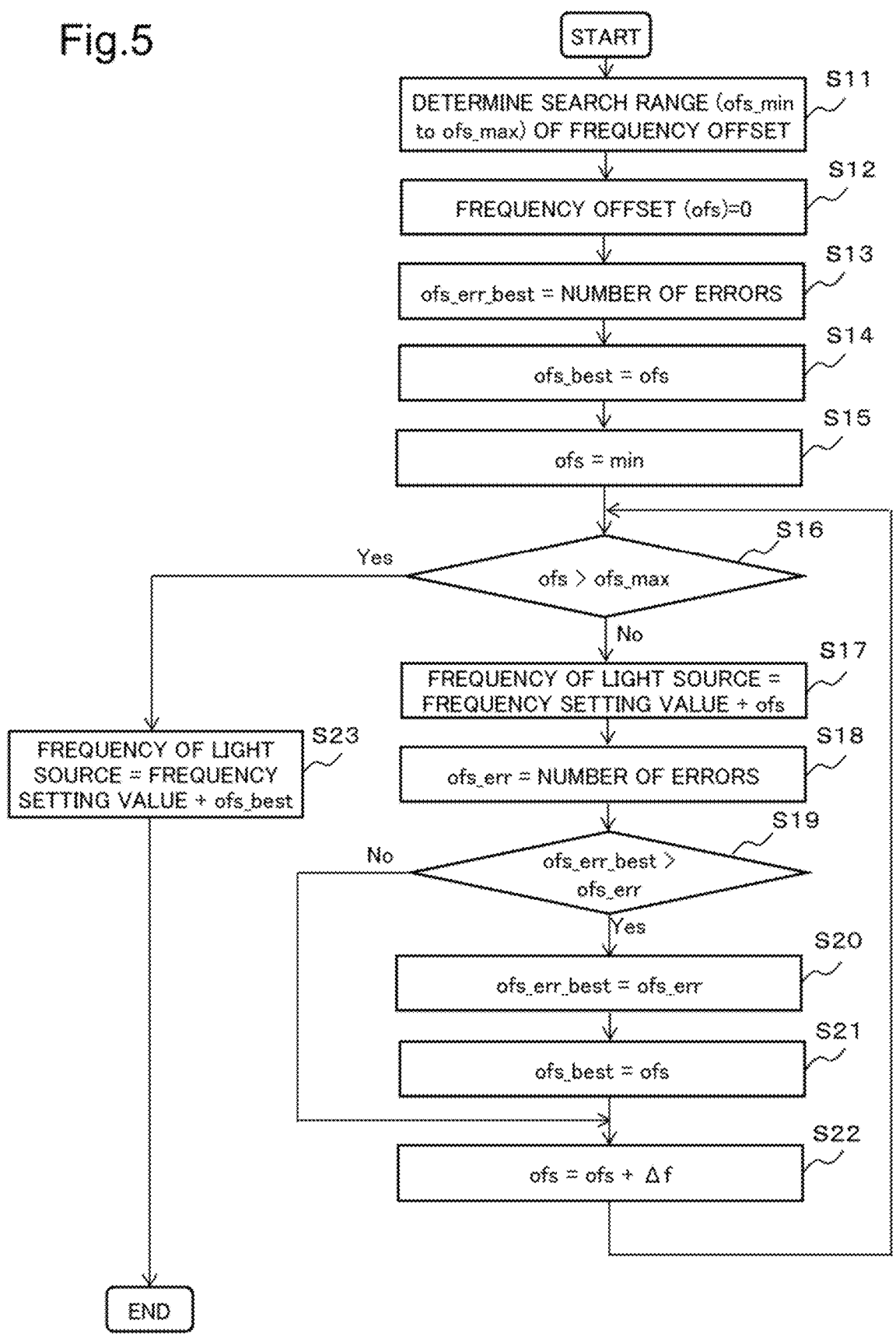
FIG. 5 is a diagram illustrating an operation flow of an optical communication system according to the second example embodiment of the present invention.

An operation performed when, in the optical transmitter 10, a frequency of light output by the light source unit 14 is adjusted is described in more detail. FIG. 5 illustrates an operation flow performed when a frequency of light output by the light source unit 14 is adjusted.

First, the frequency adjustment unit 15 sets a search range for a frequency offset, i.e. a range where when a frequency, in which the number of errors is minimum, output by the light source unit 14 is searched, an offset amount of the frequency is changed (step S11). The search range of an offset of a frequency may be previously stored in the frequency adjustment unit 15, or a set value of the search range may be input by a worker or the like.

When the search range for a frequency offset is set, the frequency adjustment unit 15 sets, as ofs=0, a frequency offset ofs, i.e. a deviation amount from a set value of a frequency of light output from the light source unit 14 (step S12). When ofs=0 is satisfied, the light source unit 14 outputs light of the set value, i.e. a frequency allocated to a local device.

The frequency adjustment unit 15 extracts information on the number of errors from error information received from the optical receiver 20, and substitutes the number of errors in which ofs=0 is satisfied into a minimum value of errors ofs_err_best (step S13). A set value of the frequency offset ofs is substituted into ofs_best indicating information on a frequency offset relevant to data substituted into the minimum value ofs_err_best (step S14). When the number of errors in which ofs=0 is satisfied is substituted into ofs_err_best, ofs_best=0 is satisfied.

When the number of errors in which the frequency offset is 0 is stored, the frequency adjustment unit 15 sets a set value of the frequency offset ofs as ofs=min, i.e. a minimum value min of the search range for a frequency offset (step S15).

The frequency adjustment unit 15 compares, when setting a value of the frequency offset ofs, the set value of the frequency offset ofs with a maximum value ofs_max of the search range for the frequency offset. When the frequency offset ofs is equal to or less than the maximum value ofs_max (No in step S16), the frequency adjustment unit 15 corrects a frequency of a light source, based on the frequency offset ofs. The frequency adjustment unit 15 calculates a frequency output by the light source unit 14 as a frequency of the light source=a frequency setting value+ofs, and sets the calculated value (step S17).

When a frequency of the light source unit 14 is set based on the frequency offset ofs, light of a frequency offset from the set value is output from the light source unit 14. When the light of the offset frequency is output to the communication path 201, information on the number of errors is transmitted from the optical receiver 20 being a transmission destination.

The frequency adjustment unit 15 substitutes, when receiving the information on the number of errors, the number of errors into ofs_err (step S18), and compares the received number of errors ofs_err with an ofs_err_best stored so far as a minimum value. When a newly-received number of errors is smaller (Yes in step S19), the frequency adjustment unit 15 updates the ofs_err_best with a value of the newly-received number of errors ofs_err (step S20). The frequency adjustment unit 15 substitutes, when updating the ofs_err_best, a value of the frequency offset ofs into the ofs_best indicating information on a frequency offset relevant to the minimum value ofs_err_best (step S21).

The frequency adjustment unit 15 changes, when updating the information on a frequency offset relevant to the minimum value ofs_err_best, the frequency offset ofs as ofs=ofs+$\Delta$f (step S22), and performs an operation from step S16. A $\Delta$f being an amount for changing a frequency offset is previously set. The $\Delta$f may set by dividing the search range for the frequency offset by a previously-set number.

The frequency adjustment unit 15 changes, when the newly-received number of errors is equal to or more than a minimum value so far (No in step S19), the frequency offset ofs as ofs=ofs+$\Delta$f, and performs an operation from step S16.

When, in step S16, the frequency offset ofs is larger than the maximum value ofs_max of the search range (Yes in step S16), the frequency adjustment unit 15 sets a setting of a frequency of the light source unit 14 as a frequency relevant to the minimum value ofs_err_best. The frequency adjustment unit 15 calculates as a frequency of the light source=a frequency setting value+ofs_best, and controls a frequency of a signal output by the light source unit 14 in such a way as to be the calculated frequency (step S23).

FIG. 6 is a graph illustrating an example of a relation between an offset amount of a frequency and the number of errors. In the example of FIG. 6, the offset amount of the frequency is changed with respect to each $\Delta$f, and thereby the number of errors is measured. In the example of FIG. 6, $-3\Delta$f in which the number of errors is minimum is set as the offset amount of the frequency of light output by the light source unit 14.

In the optical communication system according to the present example embodiment, the error information is transmitted from the optical receiver 20 to the optical transmitter 10 via the communication path 202, but when bidirectional optical communication is performed, the error information may be added to a frame transmitted as a main signal from the optical receiver 20 to the optical transmitter 10. FIG. 7 illustrates a configuration of an OTN frame. When data communication based on the OTN frame as in FIG. 7 is performed, for example, the error information is added to a reserved bit of an overhead, and thereby the error information can be transmitted from the optical receiver 20 to the optical transmitter 10. When such a configuration is constructed, communication using the communication path 202 is unnecessary, and therefore a configuration is simplified.

Figure 8A:
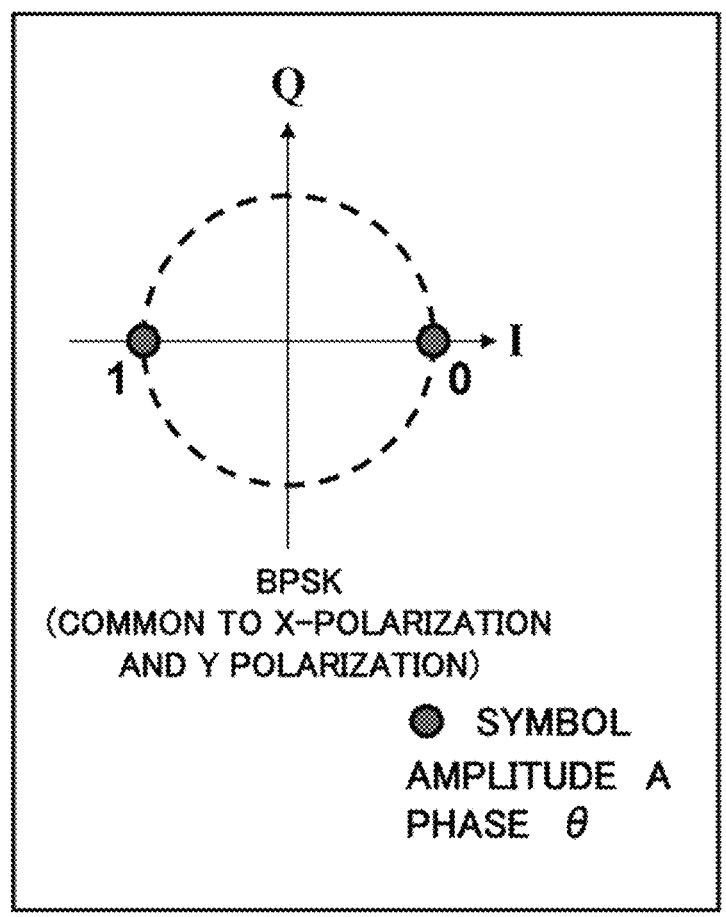
FIG. 8A is a diagram illustrating an example of a constellation in a multi-value modulation method.
Figure 8B:
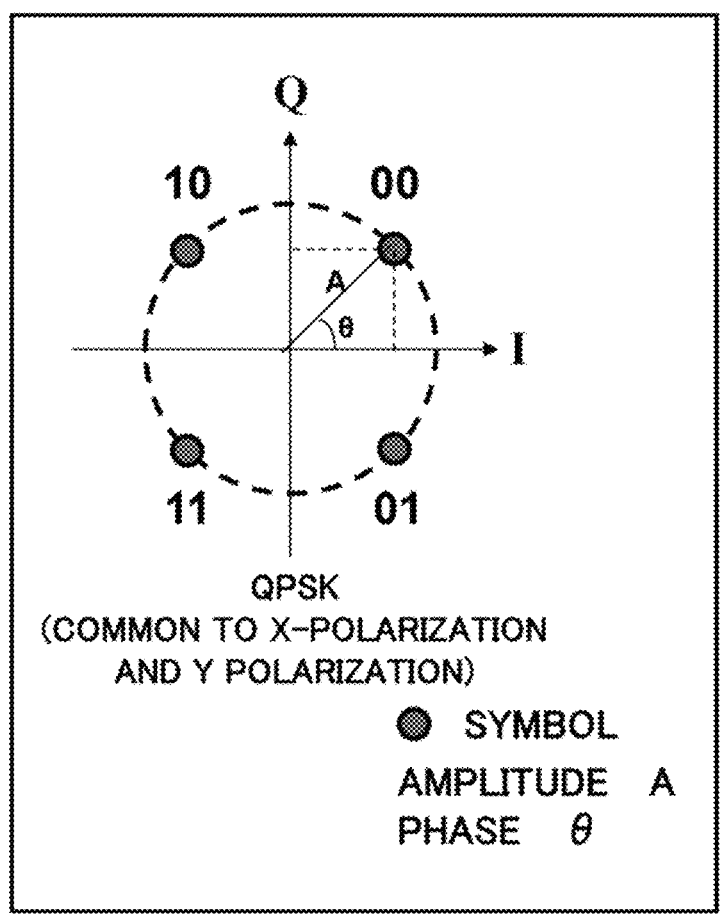
FIG. 8B is a diagram illustrating an example of a constellation in the multi-value modulation method.

FIG. 8A is a diagram illustrating a constellation in which a BPSK modulation method is used. FIG. 8B is a diagram illustrating a constellation in which a QPSK modulation method is used. In the constellation in FIGS. 8A and 8B, a symbol of a signal is illustrated in a plane where the same phase component as a carrier is designated as I-axis and a phase component orthogonal to the carrier is designated as Q-axis. In a case of the BPSK modulation method, a symbol is mapped on the I-axis, and therefore when a frequency offset between an optical signal and local oscillation light is small, a state in FIG. 8 occurs and the Q-phase component of the optical signal becomes 0. In this state, when a gain is automatically controlled in such a way as to cause an output amplitude to be constant in the optical detection unit 24, an input signal to a Q-ch to which a signal of the Q-phase component is input does not exist, and therefore the output amplitude is not increased when a signal of the Q-ch is amplitude. Therefore, a gain is set to be large in order to increase the output amplitude of a signal of the Q-ch, a noise component is added to the Q-ch, and therefore signal quality is degraded.

Figure 9:
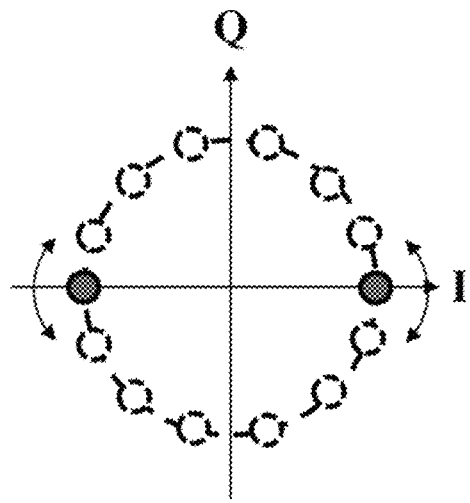
FIG. 9 is a diagram illustrating an example of a change of a constellation in the multi-value modulation method.

In contrast, when the frequency offset occurs between a light source of an optical signal and a light source of local oscillation light, a constellation rotates as illustrated in FIG. 9. In the BPSK method illustrated in FIG. 8A, while only the I-axis component is included, not only the I-axis component but also the Q-axis component can be caused to have a value when the frequency offset is intentionally generated. When the Q-axis component is included, an appropriate gain is set, and thereby noise of a signal is avoided from increasing excessively and signal quality degradation can be prevented.

According to the optical communication system of the present example embodiment, the frequency adjustment unit 15 of the optical transmitter 10 adjusts, based on the error information detected in the error detection unit 28 of the optical receiver 20, a frequency of light output from the light source unit 14. Adjustment of the frequency is adjusted in such a way as to decrease the number of errors, and thereby an appropriate offset can be added to a frequency of an optical signal transmitted from the optical transmitter 10 and a frequency of local oscillation light used for detecting a reception signal in the optical receiver 20. As a result, the optical communication system according to the present example embodiment can reduce an influence of noise generated in the reception signal and maintain reception quality.

Third Example Embodiment

Figure 10:
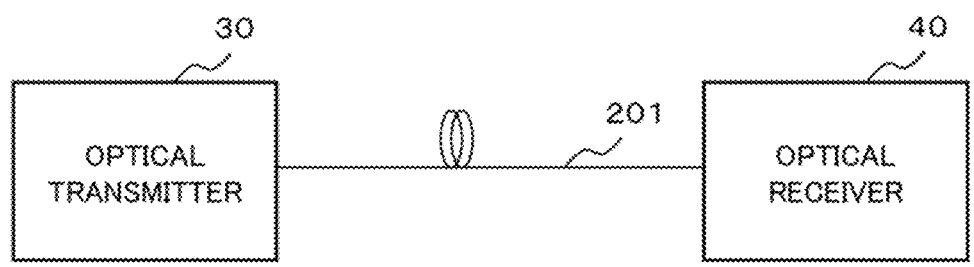
FIG. 10 is a diagram illustrating an outline of a configuration according to a third example embodiment of the present invention.

An optical communication system according to a third example embodiment of the present invention is described. FIG. 10 illustrates an outline of a configuration of the optical communication system according to the present example embodiment. The optical communication system according to the present example embodiment includes an optical transmitter 30 and an optical receiver 40. The optical transmitter 30 and the optical receiver 40 are connected to each other via a communication path 201.

The optical communication system according to the present example embodiment is a network system that performs, similarly to the second example embodiment, optical communication based on a digital coherent method through the communication path 201. While the optical communication system according to the second example embodiment adjusts an offset amount of a frequency of a light source of an optical transmitter, the optical communication system according to the present example embodiment is characterized by adjusting the offset amount of a frequency of local oscillation light of an optical receiver.

Figure 11:
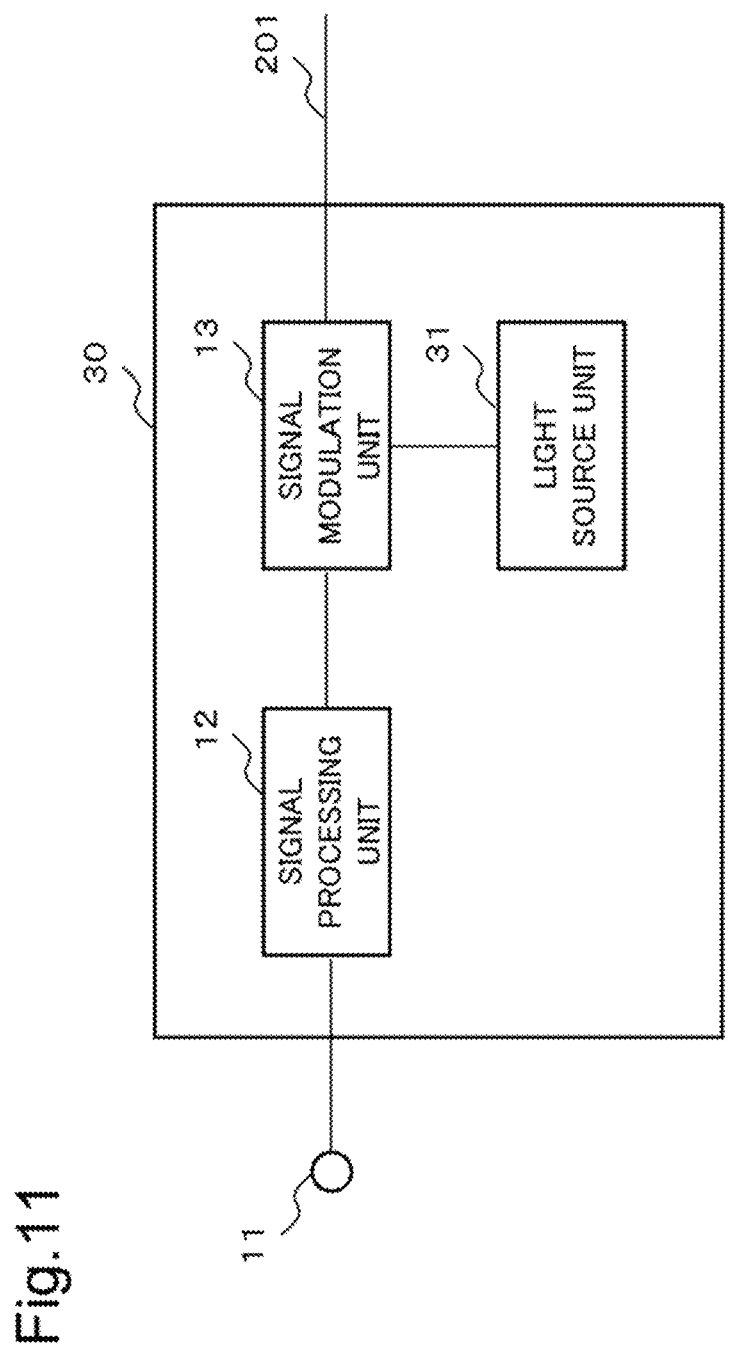
FIG. 11 is a diagram illustrating a configuration of an optical transmitter according to the third example embodiment of the present invention.

A configuration of the optical transmitter 30 is described. FIG. 11 illustrates a configuration of the optical transmitter 30 according to the present example embodiment. The optical transmitter 30 includes a client-signal input unit 11, a signal processing unit 12, a signal modulation unit 13, and a light source unit 31. A configuration and a function of each of the client-signal input unit 11, the signal processing unit 12, and the signal modulation unit 13 according to the present example embodiment are similar to a portion of the same name according to the second example embodiment.

The light source unit 31 includes, other than an offset function for a frequency of output light, a function similar to the light source unit 14 according to the second example embodiment. In other words, the light source unit 31 includes a semiconductor laser, and outputs continuous light of a predetermined frequency to the signal modulation unit 13. The predetermined frequency is allocated based on wavelength design of an optical communication network.

Figure 12:
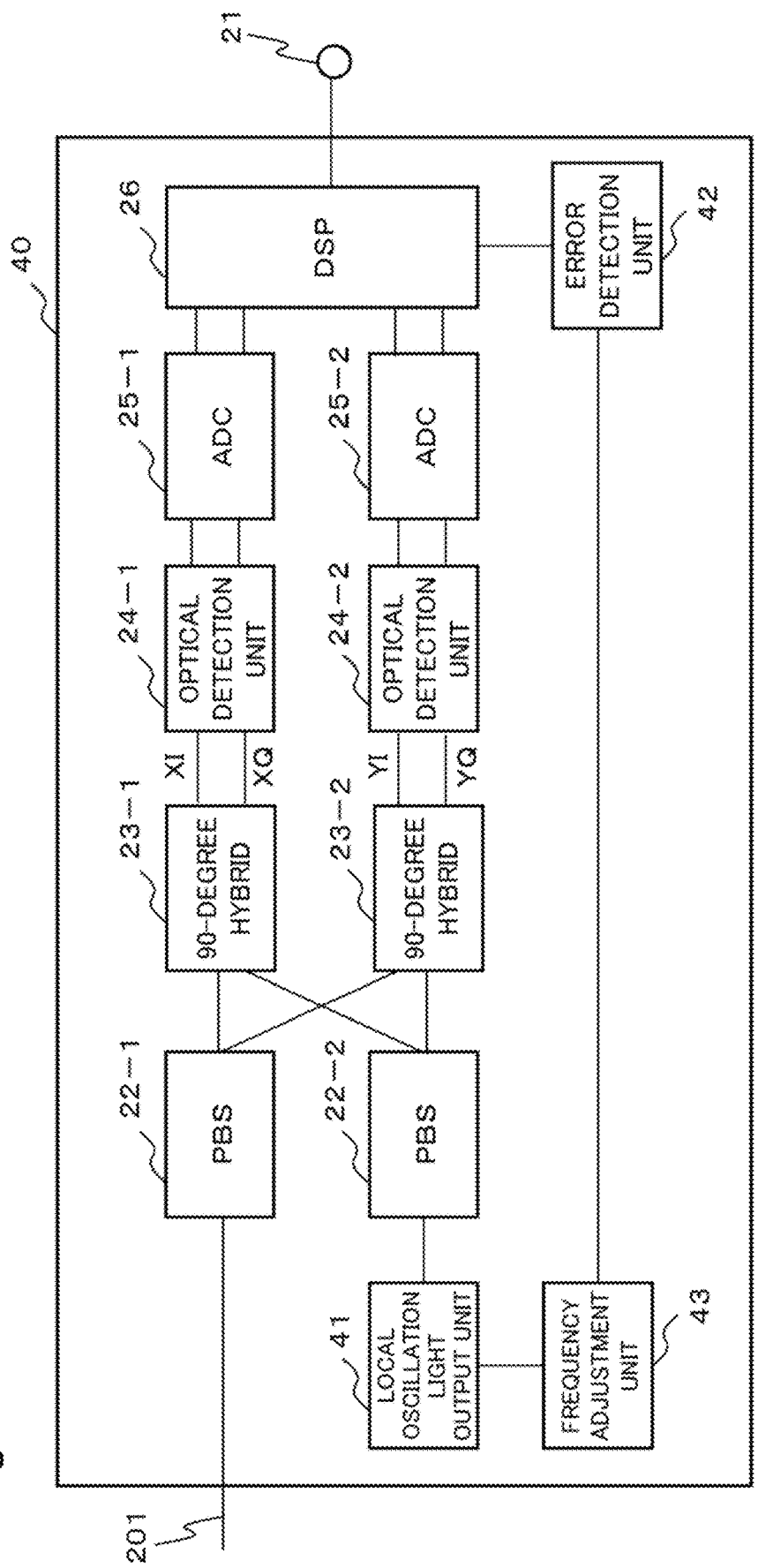
FIG. 12 is a diagram illustrating a configuration of an optical receiver according to the third example embodiment of the present invention.

A configuration of the optical receiver 40 is described. FIG. 12 illustrates a configuration of the optical receiver 40 according to the present example embodiment. The optical receiver 40 includes a client-signal output unit 21, a PBS 22, a 90-degree hybrid 23, an optical detection unit 24, an ADC 25, a DSP 26, a local oscillation light output unit 41, an error detection unit 42, and a frequency adjustment unit 43.

A configuration and a function of each of the client-signal output unit 21, the PBS 22, the 90-degree hybrid 23, the optical detection unit 24, the ADC 25, and the DSP 26 are similar to a portion of the same name according to the second example embodiment. In other words, as the PBS 22, a PBS 22-1 that polarization-separates an optical signal input via the communication path 201 and a PBS 22-2 that polarization-separates local oscillation light are provided. A 90-degree hybrid 23-1 that processes an X-polarization signal, an optical detection unit 24-1, and an ADC 25-1; and a 90-degree hybrid 23-2 that processes a Y-polarization signal, an optical detection unit 24-2, and an ADC 25-2 are provided.

The local oscillation light output unit 41 generates local oscillation light of a predetermined frequency used when the light is multiplexed with the optical signal transmitted via the communication path 201 and optical signals of a number for performing coherent detection are generated. The local oscillation light output unit 41 is configured by using a semiconductor laser. The predetermined frequency is set based on a frequency of the optical signal transmitted via the communication path 201. The local oscillation light output unit 41 outputs light of a frequency in which an offset is added to the predetermined frequency. An offset amount of the frequency is controlled by the frequency adjustment unit 43.

The error detection unit 42 includes a function similar to the error detection unit 28 according to the second example embodiment. The error detection unit 42 according to the present example embodiment monitors reception processing for a signal in the DSP 26, and measures the number of errors, based on the number of error corrections. The error detection unit 42 transmits error information calculated based on a measurement result of the error to the frequency adjustment unit 43 inside a local device. The error detection unit 42 according to the present example embodiment transmits, as the error information, a BER to the frequency adjustment unit 43. The error detection unit 42 may be integrated with the DSP 26 as a part of the DSP 26.

The frequency adjustment unit 43 controls the offset amount of a frequency of the local oscillation light output unit 41. The frequency adjustment unit 43 controls the offset amount of the frequency, based on the error information transmitted from the error detection unit 42. The frequency adjustment unit 43 controls the offset amount of the frequency in such a way as to decrease the BER transmitted as the error information.

An operation of the optical communication system according to the present example embodiment is described. The optical communication system according to the present example embodiment operates similarly to the optical communication system according to the second example embodiment in an operation other than adjustment of a frequency offset between an optical signal and local oscillation light. The optical communication system according to the present example embodiment adjusts, based on a detection result of the number of errors in the optical receiver 40, the frequency offset between the optical signal and the local oscillation light. In other words, in the optical communication system according to the present example embodiment, the frequency adjustment unit 43 of the optical receiver 40 changes the offset amount from a set value of the frequency of the local oscillation light output from the local oscillation light output unit 41, and controls the frequency of the local oscillation light, based on an offset amount in which the number of errors is minimum.

The optical communication system according to the present example embodiment produces an advantageous effect similar to the advantageous effect of the optical communication system according to the second example embodiment. An optical receiver 40 side adjusts, based on the number of errors, a frequency of local oscillation light, and therefore it is unnecessary to transmit the number of errors to the optical transmitter 30, whereby a configuration of a system can be more simplified.

Fourth Example Embodiment

Figure 13:
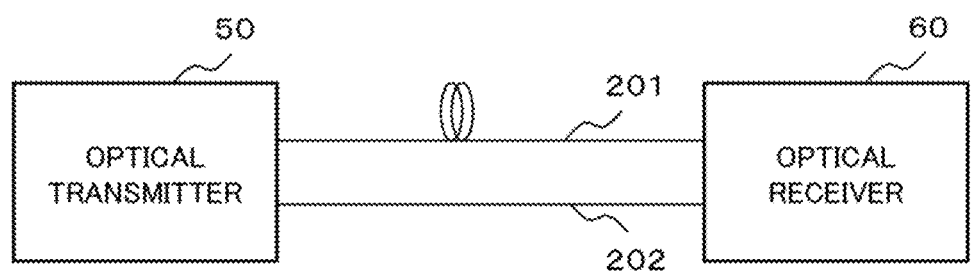
FIG. 13 is a diagram illustrating an outline of a configuration according to a fourth example embodiment of the present invention.

A fourth example embodiment of the present invention is described in detail with reference to drawings. FIG. 13 illustrates an outline of a configuration of an optical communication system according to the present example embodiment. The optical communication system according to the present example embodiment includes an optical transmitter 50 and an optical receiver 60. The optical transmitter 50 and the optical receiver 60 are connected via a communication path 201 and a communication path 202.

The optical communication system according to the present example embodiment is a network system that performs, similarly to the second example embodiment, optical communication based on a digital coherent method via the communication path 201. While the optical communication system according to the second example embodiment adjusts an optical signal in such a way as to minimize the number of errors and thereby adjusts an offset of a frequency between an optical signal and local oscillation light. The optical communication system according to the present example embodiment is characterized by monitoring, instead of such a configuration, a frequency of an optical signal and adjusting a frequency of light output from a light source unit in such a way as to cause the frequency offset between an optical signal and local oscillation light to have a set value.

Figure 14:
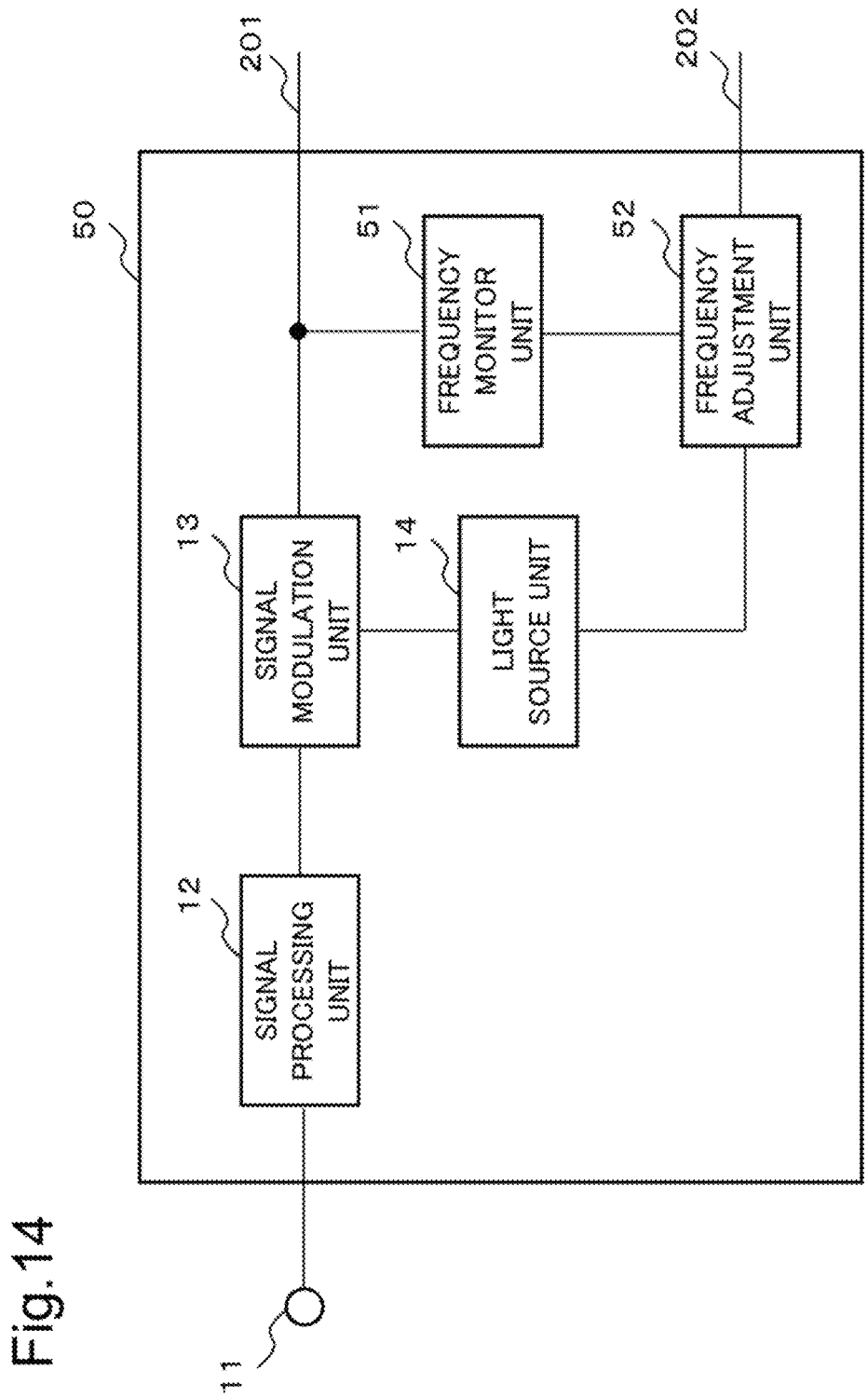
FIG. 14 is a diagram illustrating a configuration of an optical transmitter according to the fourth example embodiment of the present invention.

A configuration of the optical transmitter 50 is described. FIG. 14 illustrates a configuration of the optical transmitter 50 according to the present example embodiment. The optical transmitter 50 includes a client-signal input unit 11, a signal processing unit 12, a signal modulation unit 13, a light source unit 14, a frequency monitor unit 51, and a frequency adjustment unit 52.

A configuration and a function of each of the client-signal input unit 11, the signal processing unit 12, the signal modulation unit 13, and the light source unit 14 according to the present example embodiment are similar to a portion of the same name according to the second example embodiment.

The frequency monitor unit 51 includes a function of measuring a frequency of an output signal of the signal processing unit 12. For example, an output signal of the signal modulation unit 13 is branched by an optical coupler and the branched signal is input to the frequency monitor unit 51. The frequency monitor unit 51 transmits information on a frequency of the output signal of the signal modulation unit 13 to the frequency adjustment unit 52.

The frequency adjustment unit 52 controls an offset value of a frequency of light output by the light source unit 14, based on the frequency of the output signal transmitted from the frequency monitor unit 51 and a frequency of local oscillation light transmitted from the optical receiver 60 via the communication path 202. The frequency adjustment unit 52 monitors a difference, i.e. a frequency offset between the frequency of the output signal transmitted from the frequency monitor unit 51 and the frequency of the local oscillation light transmitted from the optical receiver 60. The frequency adjustment unit 52 controls, based on a set value of the frequency offset set in such a way as to cause the frequency offset not to be 0, an offset amount of a frequency of light output by the light source unit 14.

Figure 15:
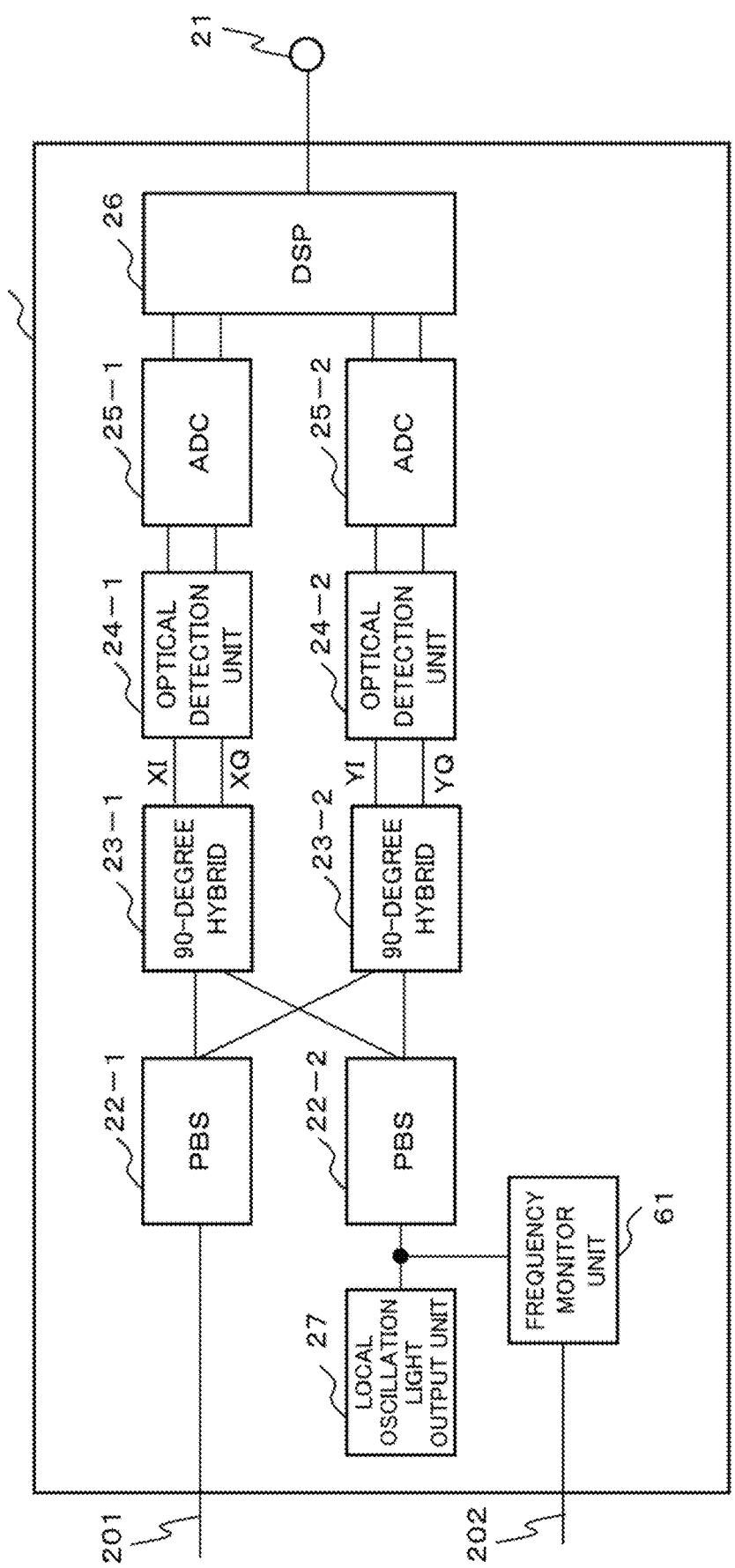
FIG. 15 is a diagram illustrating a configuration of an optical receiver according to the fourth example embodiment of the present invention.

A configuration of the optical receiver 60 is described. FIG. 15 illustrates a configuration of the optical receiver 60 according to the present example embodiment. The optical receiver 60 includes a client-signal output unit 21, a PBS 22, a 90-degree hybrid 23, an optical detection unit 24, an ADC 25, a DSP 26, a local oscillation light output unit 27, and a frequency monitor unit 61.

A configuration and a function of each of the client-signal output unit 21, the PBS 22, the 90-degree hybrid 23, the optical detection unit 24, the ADC 25, the DSP 26, and the local oscillation light output unit 27 are similar to a portion of the same name according to the second example embodiment. In other words, as the PBS 22, a PBS 22-1 that polarization-separates an optical signal input via the communication path 201 and a PBS 22-2 that polarization-separates local oscillation light are provided. A 90-degree hybrid 23-1 that processes an X-polarized wave, an optical detection unit 24-1, and an ADC 25-1; and a 90-degree hybrid 23-2 that processes a Y-polarized wave, an optical detection unit 24-2, and an ADC 25-2 are provided.

The frequency monitor unit 61 includes a function of measuring a frequency of output light of the local oscillation light output unit 27. The output light of the local oscillation light output unit 27 is branched, for example, by an optical coupler, and the branched signal is input to the frequency monitor unit 61. The frequency monitor unit 61 transmits information on a frequency of the output light of the local oscillation light output unit 27 to the frequency adjustment unit 52 of the optical transmitter 50 via the communication path 202.

An operation of the optical communication system according to the present example embodiment is described. The optical communication system according to the present example embodiment operates similarly to the optical communication system according to the second example embodiment in an operation other than adjustment of a frequency offset between an optical signal and local oscillation light.

Figure 16:
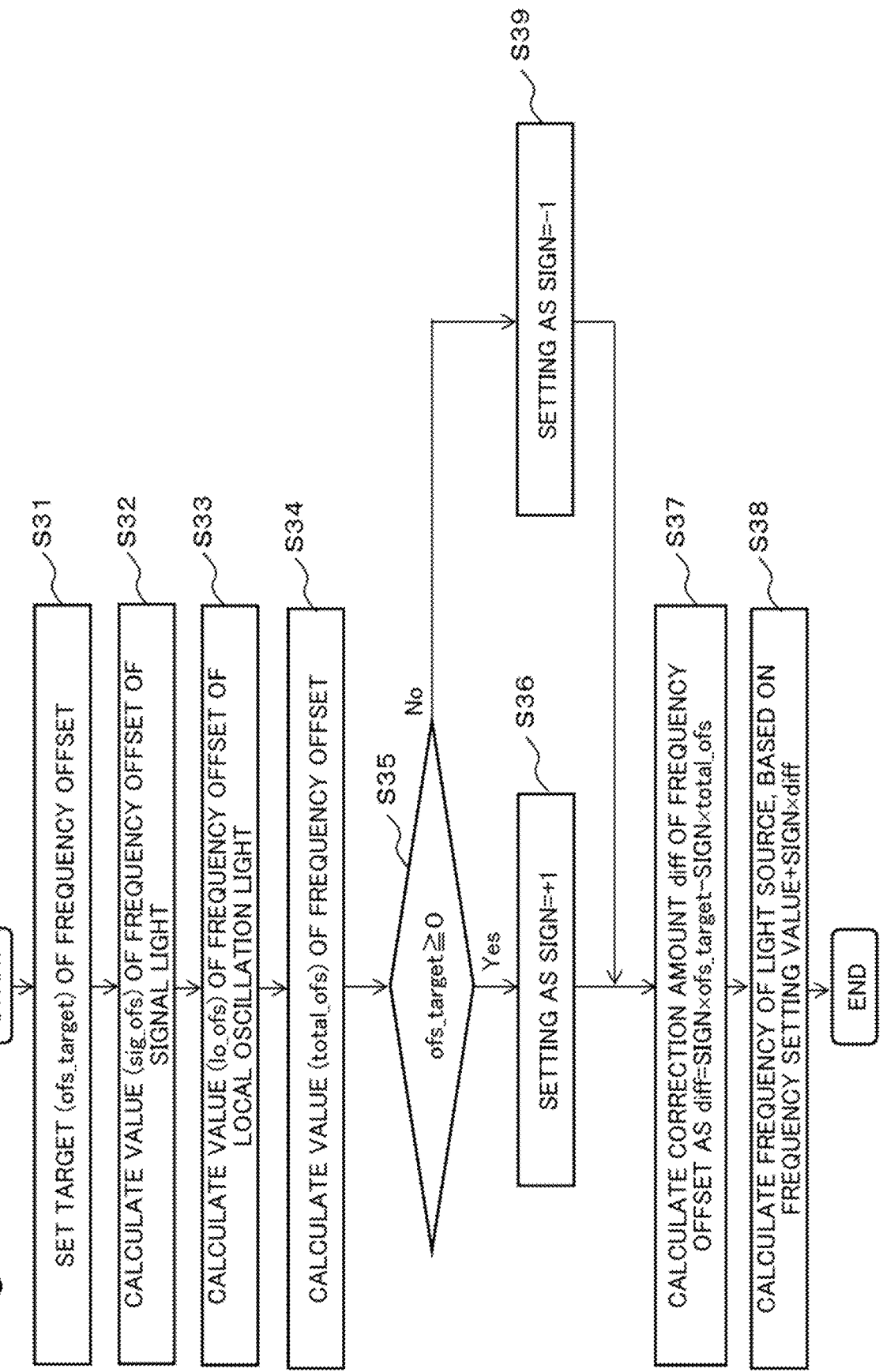
FIG. 16 is a diagram illustrating an operation flow of an optical communication system according to the fourth example embodiment of the present invention.

An operation of adjusting a frequency output by the light source unit 14 in the optical transmitter 50 according to the present example embodiment is described. FIG. 16 illustrates an operation flow used when a frequency of light output by the light source unit 14 is adjusted.

First, the frequency adjustment unit 52 sets a target ofs_target for a frequency offset (step S31). The target ofs_target for the frequency offset is referred to as a goal of a difference between the frequency of the light output by the light source unit 14 and a frequency of light output by the local oscillation light output unit 41. The target ofs_target for the frequency offset is previously stored in the frequency adjustment unit 52. For the target ofs_target for the frequency offset, a set value may be input by a worker or the like.

When the target ofs_target for the frequency offset is set, the frequency adjustment unit 52 calculates a frequency offset sig_ofs of the optical signal, i.e. a difference between a frequency of an optical signal actually output and a set value of the frequency of the optical signal (step S32). The frequency adjustment unit 52 calculates, based on a monitor result of the frequency of the optical signal transmitted from the frequency monitor unit 51, the frequency offset sig_ofs of the optical signal. The frequency adjustment unit 52 calculates the frequency offset of the optical signal as a frequency offset sig_ofs=a frequency monitor value of the optical signal−a frequency setting value of the optical signal.

The frequency adjustment unit 52 calculates, when calculating the frequency offset of the optical signal, a frequency offset lo_ofs of local oscillation light, i.e. a difference between a frequency of the local oscillation light actually output in the optical receiver 60 and a set value of the frequency of the local oscillation light (step S33). The frequency adjustment unit 52 calculates, based on a monitor result of a frequency of local oscillation light transmitted from the frequency monitor unit 61 via the communication path 202, the frequency offset lo_ofs of the local oscillation light. The frequency adjustment unit 52 calculates the frequency offset of the local oscillation light as a frequency offset lo_ofs=a monitor result of the frequency of the local oscillation light−a frequency setting value of the local oscillation light.

The frequency adjustment unit 52 calculates, when calculating the frequency offset of each of the optical signal and the local oscillation light, a frequency offset total_ofs between the optical signal and the local oscillation light (step S34). The frequency adjustment unit 52 calculates the frequency offset between the optical signal and the local oscillation light, based on the offset total_ofs of a frequency=the frequency offset sig_ofs of the optical signal−the frequency offset lo_ofs of the local oscillation light.

The frequency adjustment unit 52 confirms, when calculating a difference in frequency between the optical signal and the local oscillation light, i.e. the frequency offset, a positive/negative of the target ofs_target for the frequency offset, and determines a coefficient SIGN used when a correction amount diff of the frequency of the light output by the light source unit 14 is calculated.

When a value of the target ofs_target of the frequency offset is equal to or more than 0 (Yes in step S35), the frequency adjustment unit 52 sets the coefficient SIGN as adding a value 1 (step S36). When the value of the target ofs_target of the frequency offset is smaller than 0 (No in step S35), the frequency adjustment unit 52 sets the coefficient SIGN as subtracting a value 1 (step S39).

The frequency adjustment unit 52 calculates, when determining the coefficient SIGN used when the correction amount diff of the frequency of the light output by the light source unit 14 is calculated, the correction amount diff of the frequency offset (step S37). The frequency adjustment unit 52 calculates the correction amount diff as diff=SIGN×ofs_target−SIGN×total_ofs.

The frequency adjustment unit 52 calculates, when calculating the correction amount diff of the frequency, a frequency of the light output by the light source unit 14 as a frequency setting value+SIGN×diff (step S38). The frequency adjustment unit 52 controls, when calculating the frequency of the light output by the light source unit 14, the light source unit 14 in such a way as to output light of the calculated frequency.

The optical communication system according to the present example embodiment monitors frequencies of an optical signal and local oscillation light, and the frequency adjustment unit 52 controls a frequency of light output from the light source unit 14 in such a way that a frequency offset being a difference in frequency between the optical light and the local oscillation light has a set value. In this manner, the frequencies of the optical signal and the local oscillation light are maintained to be the set value other than 0 and the frequency offset is caused between the optical signal and the local oscillation light, and thereby noise generated in a signal of a Q-ch can be reduced. As a result, the optical communication system according to the present example embodiment can reduce an influence of noise generated in a reception signal and maintain reception quality.

Fifth Example Embodiment

Figure 17:
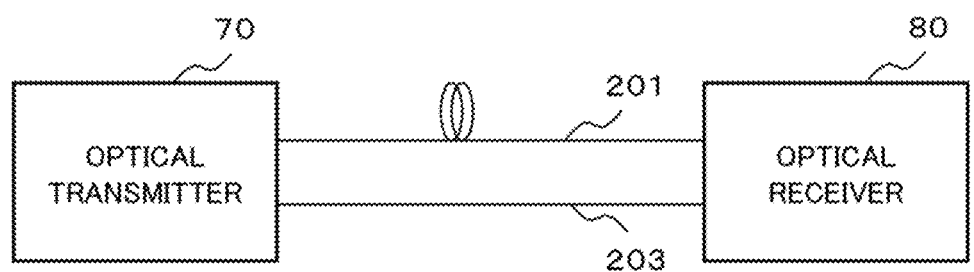
FIG. 17 is a diagram illustrating an outline of a configuration according to a fifth example embodiment of the present invention.

A fifth example embodiment of the present invention is described in detail with reference to drawings. FIG. 17 illustrates an outline of a configuration of an optical communication system according to the present example embodiment. The optical communication system according to the present example embodiment includes an optical transmitter 70 and an optical receiver 80. The optical transmitter 70 and the optical receiver 80 are connected via a communication path 201 and a communication path 203. The communication path 203 is a communication network that transmits a control signal and the like from the optical transmitter 70 to the optical receiver 80.

The optical communication system according to the present example embodiment is a network system that performs, similarly to the second example embodiment, optical communication based on a digital coherent method via the communication path 201. The optical communication system according to the present example embodiment is characterized by controlling, based on a measurement result of frequencies of an optical signal and local oscillation light, a frequency of local oscillation light of the optical receiver 80 in such a way as to cause a frequency offset between the optical signal and the local oscillation light to have a set value.

Figure 18:
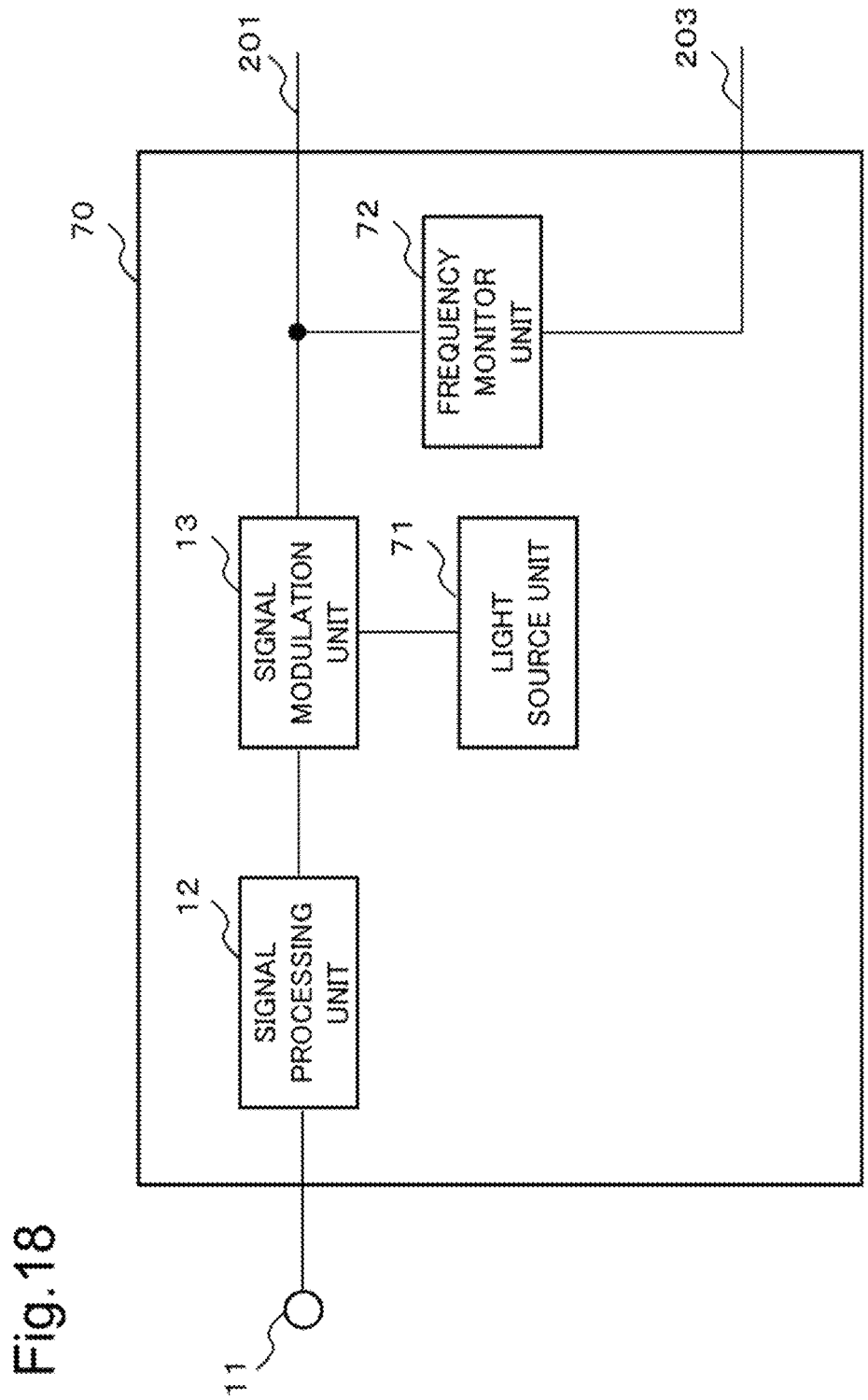
FIG. 18 is a diagram illustrating a configuration of an optical transmitter according to the fifth example embodiment of the present invention.

A configuration of the optical transmitter 70 is described. FIG. 18 illustrates a configuration of the optical transmitter 70 according to the present example embodiment. The optical transmitter 70 includes a client-signal input unit 11, a signal processing unit 12, a signal modulation unit 13, a light source unit 71, and a frequency monitor unit 72. A configuration and a function of each of the client-signal input unit 11, the signal processing unit 12, and the signal modulation unit 13 according to the present example embodiment are similar to a portion of the same name according to the second example embodiment.

The light source unit 71 includes, other than an offset function for a frequency of output light, a function similar to the light source unit 14 according to the second example embodiment. In other words, the light source unit 71 includes a semiconductor laser, and outputs continuous light of a predetermined frequency to the signal modulation unit 13. The predetermined frequency is allocated based on wavelength design of an optical communication network.

The frequency monitor unit 72 includes a function of measuring a frequency of an output signal of the signal processing unit 12. For example, an output signal of the signal modulation unit 12 is branched by an optical coupler and the branched signal is input to the frequency monitor unit 72. The frequency monitor unit 72 transmits information on a frequency of the output signal of the signal modulation unit 12 to the frequency adjustment unit 82 of the optical receiver 80 via the communication path 203.

Figure 19:
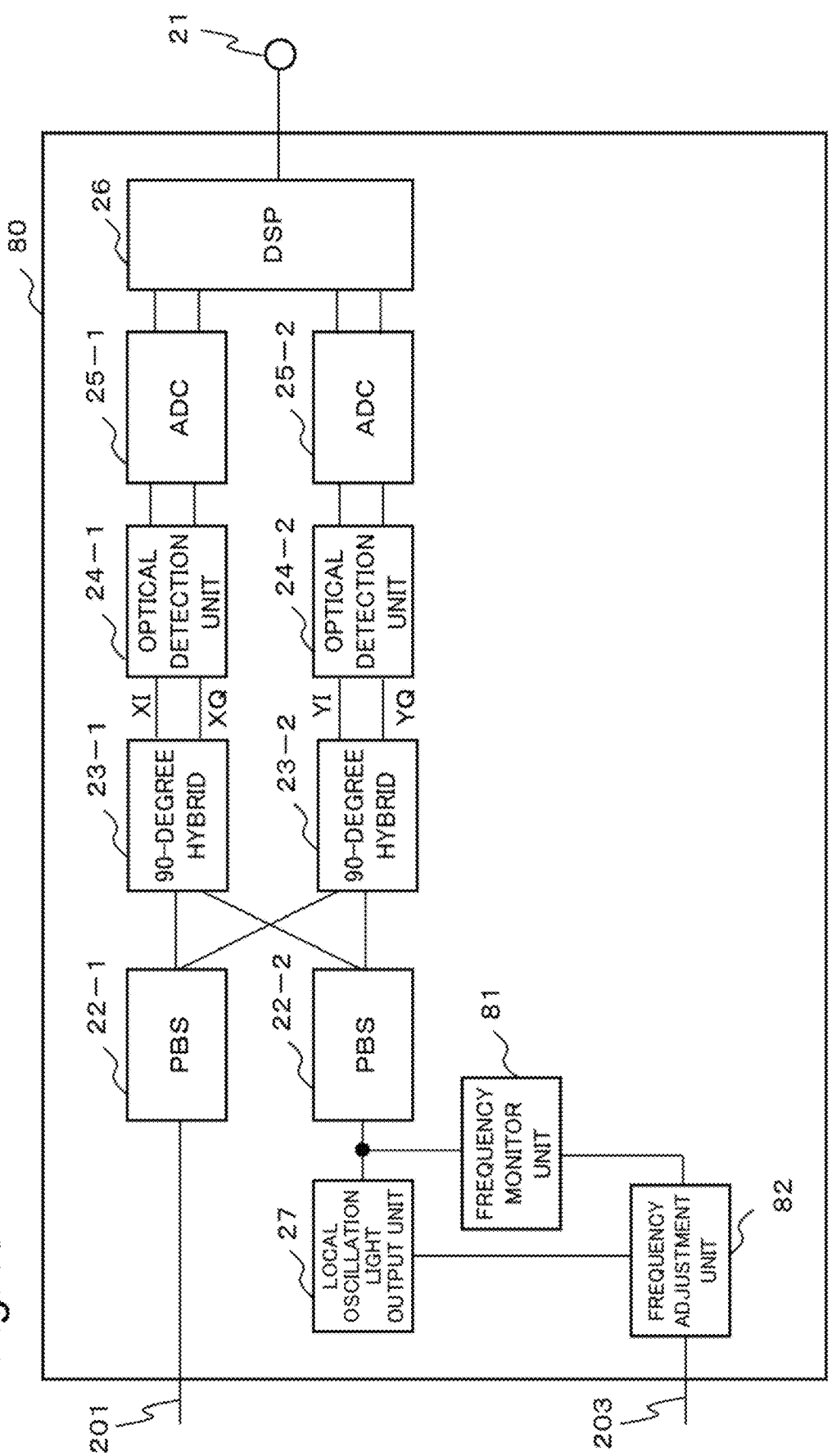
FIG. 19 is a diagram illustrating a configuration of an optical receiver according to the fifth example embodiment of the present invention.

A configuration of the optical receiver 80 is described. FIG. 19 illustrates a configuration of the optical receiver 80 according to the present example embodiment. The optical receiver 80 includes a client-signal output unit 21, a PBS 22, a 90-degree hybrid 23, an optical detection unit 24, an ADC 25, a DSP 26, a local oscillation light output unit 27, a frequency monitor unit 81, and a frequency adjustment unit 82.

A configuration and a function of each of the client-signal output unit 21, the PBS 22, the 90-degree hybrid 23, the optical detection unit 24, the ADC 25, and the DSP 26 according to the present example embodiment are similar to a portion of the same name according to the second example embodiment. In other words, as the PBS 22, a PBS 22-1 that polarization-separates an optical signal input via the communication path 201 and a PBS 22-2 that polarization-separates local oscillation light are provided. A 90-degree hybrid 23-1 that processes an X-polarization signal, an optical detection unit 24-1, and an ADC 25-1; and a 90-degree hybrid 23-2 that processes a Y-polarization signal, an optical detection unit 24-2, and an ADC 25-2 are provided.

The frequency monitor unit 81 includes a function of measuring a frequency of output light of the local oscillation light output unit 27. The output light of the local oscillation light output unit 27 is branched, for example, by an optical coupler, and the branched signal is input to the frequency monitor unit 81. The frequency monitor unit 81 transmits information on a frequency of the output light of the local oscillation light output unit 27 to the frequency adjustment unit 82 of a local device.

The frequency adjustment unit 82 controls, based on a frequency of an output signal transmitted from the frequency monitor unit 72 of the optical transmitter 70 via the communication path 203 and the frequency of local oscillation light transmitted from the frequency monitor unit 81 of the local device, an offset amount of a frequency of light output by the local oscillation light output unit 27. The frequency adjustment unit 82 monitors a frequency of an optical signal transmitted from the optical transmitter 70 and the frequency of the local oscillation light, and controls, based on a set value of a frequency offset set in such a way as to cause an offset sum not to be 0, the offset amount of the frequency of the local oscillation light output by the local oscillation light output unit 27.

An operation of the optical communication system according to the present example embodiment is described. The optical communication system according to the present example embodiment operates similarly to the fourth example embodiment, other than control of a frequency of local oscillation light on an optical receiver side and adjustment of a frequency offset. In the optical communication system according to the present example embodiment, the frequency adjustment unit 82 of the optical receiver 80 calculates a difference between frequencies, based on the frequency of the optical signal transmitted from the optical transmitter 70 and the frequency of the local oscillation light measured in the local device. The frequency adjustment unit 82 adjusts, based on a difference in frequency between an optical signal and local oscillation light and a set value of a frequency offset, a frequency of the local oscillation light. The frequency adjustment unit 82 adjusts the frequency of the local oscillation light output from the local oscillation light output unit 27 in such a way that the calculated difference in frequency between the optical signal and the local oscillation light and the set value of the frequency offset are matched.

The optical communication system according to the present example embodiment produces an advantageous effect similar to the advantageous effect of the optical communication system according to the fourth example embodiment. In other words, the optical communication system according to the present example embodiment monitors frequencies of an optical signal and local oscillation light, and the frequency adjustment unit 82 controls a frequency of light output from the local oscillation light output unit 27 in such a way that a frequency offset being a difference in frequency between the optical signal and the local oscillation light has a set value. In this manner, the frequencies of the optical signal and the local oscillation light are maintained to be the set value other than 0 and the frequency offset is caused between the optical signal and the local oscillation light, and thereby noise generated in a signal of a Q-ch can be reduced. As a result, the optical communication system according to the present example embodiment can reduce an influence of noise generated in a reception signal and maintain reception quality.

Sixth Example Embodiment

Figure 20:
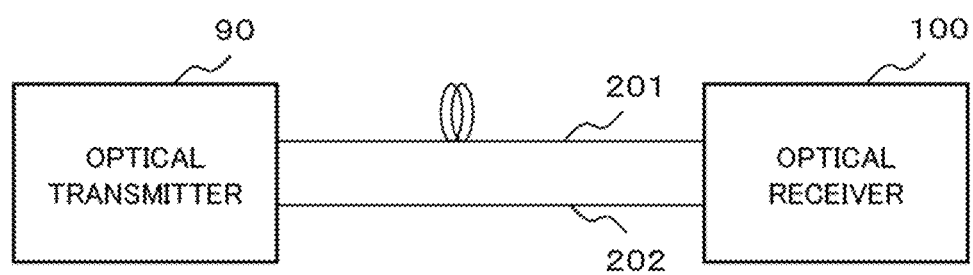
FIG. 20 is a diagram illustrating an outline of a configuration according to a sixth example embodiment of the present invention.

A sixth example embodiment of the present invention is described in detail with reference to drawings. FIG. 20 illustrates an outline of a configuration of an optical communication system according to the present example embodiment. The optical communication system according to the present example embodiment includes an optical transmitter 90 and an optical receiver 100. The optical transmitter 90 and the optical receiver 100 are connected via a communication path 201 and a communication path 202.

The optical communication system according to the present example embodiment is a network system that performs, similarly to the second example embodiment, optical communication based on a digital coherent method via the communication path 201. While the optical communication system according to the fourth and fifth example embodiments measures frequencies of an optical signal and local oscillation light and thereby calculates a frequency difference, the optical communication system according to the present example embodiment is characterized by monitoring signal processing of an optical receiver and thereby acquiring information on a frequency difference between the optical signal and the local oscillation light.

Figure 21:
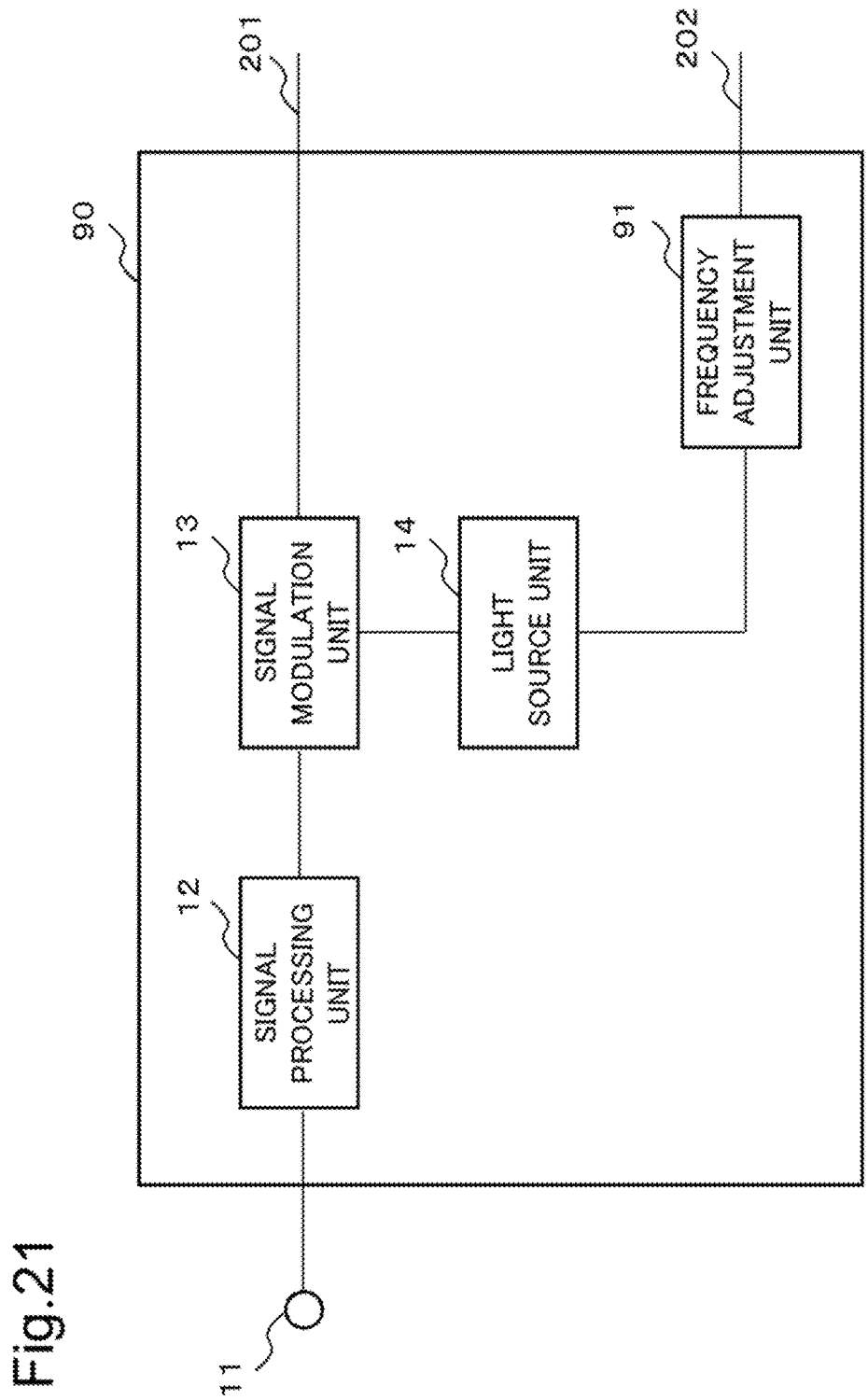
FIG. 21 is a diagram illustrating a configuration of an optical transmitter according to the sixth example embodiment of the present invention.

A configuration of the optical transmitter 90 is described. FIG. 21 illustrates a configuration of the optical transmitter 90 according to the present example embodiment. The optical transmitter 90 includes a client-signal input unit 11, a signal processing unit 12, a signal modulation unit 13, a light source unit 14, and a frequency adjustment unit 91.

A configuration and a function of each of the client-signal input unit 11, the signal processing unit 12, the signal modulation unit 13, and the light source unit 14 according to the present example embodiment are similar to a portion of the same name according to the second example embodiment.

The frequency adjustment unit 91 controls, based on an offset amount between a frequency of an output signal transmitted from a frequency-offset detection unit 101 of the optical receiver 100 via the communication path 202 and a frequency of local oscillation light of the optical receiver 100, an offset amount of a frequency of light output by the light source unit 14. The frequency adjustment unit 91 controls, based on an offset amount between frequencies of an optical signal transmitted from the optical receiver 100 and local oscillation light, the offset amount of a frequency of the light source unit 14 in such as a way as to cause an offset sum not to be 0.

Figure 22:
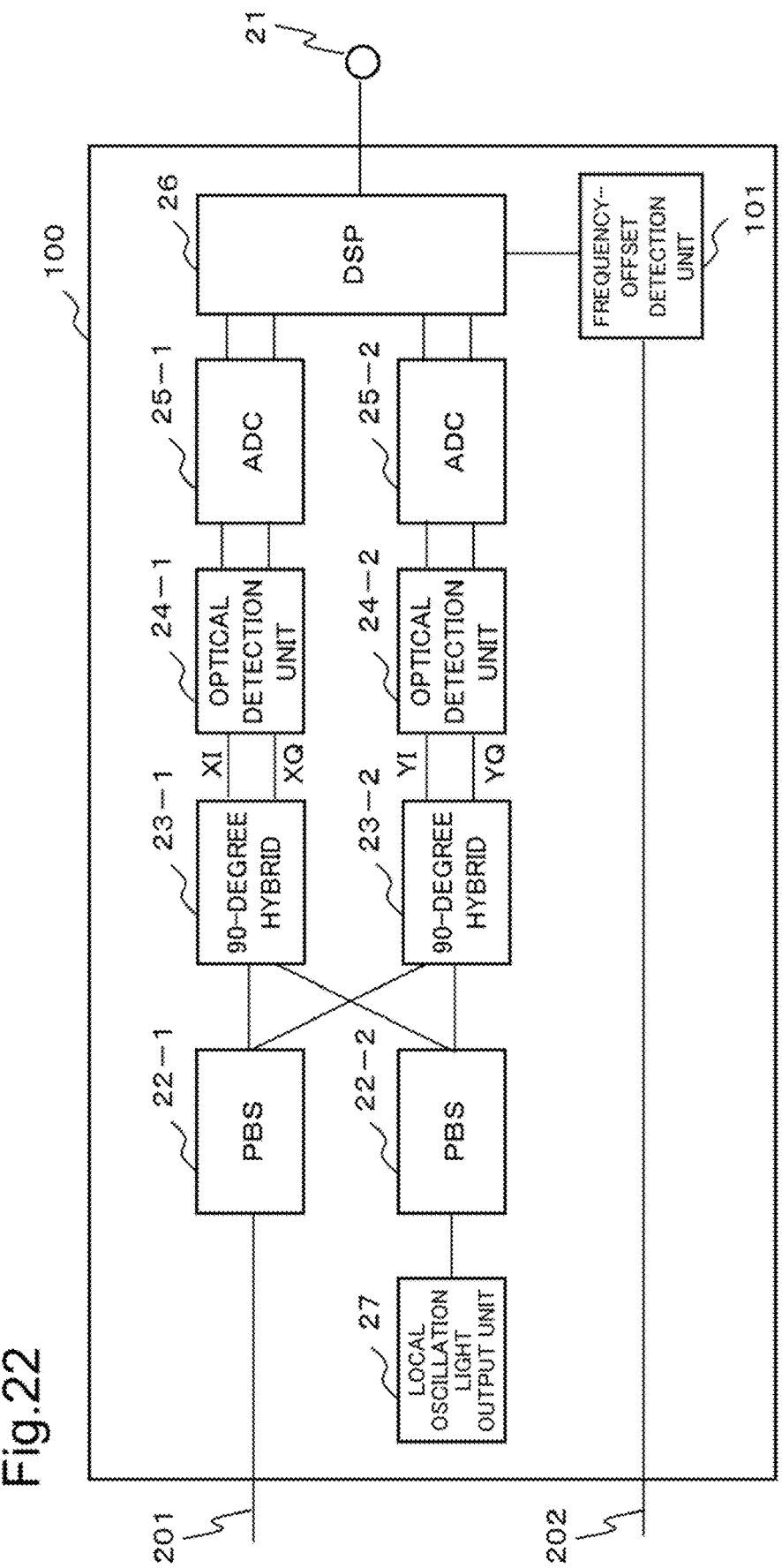
FIG. 22 is a diagram illustrating a configuration of an optical receiver according to the sixth example embodiment of the present invention.

A configuration of the optical receiver 100 is described. FIG. 22 illustrates a configuration of the optical receiver 100 according to the present example embodiment. The optical receiver 100 includes a client-signal output unit 21, a PBS 22, a 90-degree hybrid 23, an optical detection unit 24, an ADC 25, a DSP 26, a local oscillation light output unit 27, and the frequency-offset detection unit 101.

A configuration and a function of each of the client-signal output unit 21, the PBS 22, the 90-degree hybrid 23, the optical detection unit 24, the ADC 25, the DSP 26, and the local oscillation light output unit 27 are similar to a portion of the same name according to the second example embodiment. In other words, as the PBS 22, a PBS 22-1 that polarization-separates an optical signal input via the communication path 201 and a PBS 22-2 that polarization-separates local oscillation light are provided. A 90-degree hybrid 23-1 that processes an X-polarization signal, an optical detection unit 24-1, and an ADC 25-1; and a 90-degree hybrid 23-2 that processes a Y-polarization signal, an optical detection unit 24-2, and an ADC 25-2 are provided.

The frequency-offset detection unit 101 monitors reception processing in the DSP 26, and detects, as a frequency offset, a difference between a frequency of an optical signal transmitted by the optical transmitter 90 and a frequency of local oscillation light output by the local oscillation light output unit 27. The frequency-offset detection unit 101 transmits information on the frequency offset indicating the detected difference between the frequencies of the optical signal and the local oscillation light to the frequency adjustment unit 91 of the optical transmitter 90 via the communication path 202. The frequency-offset detection unit 101 may be integrated with the DSP 26 as a part of the DSP 26.

Figure 23:
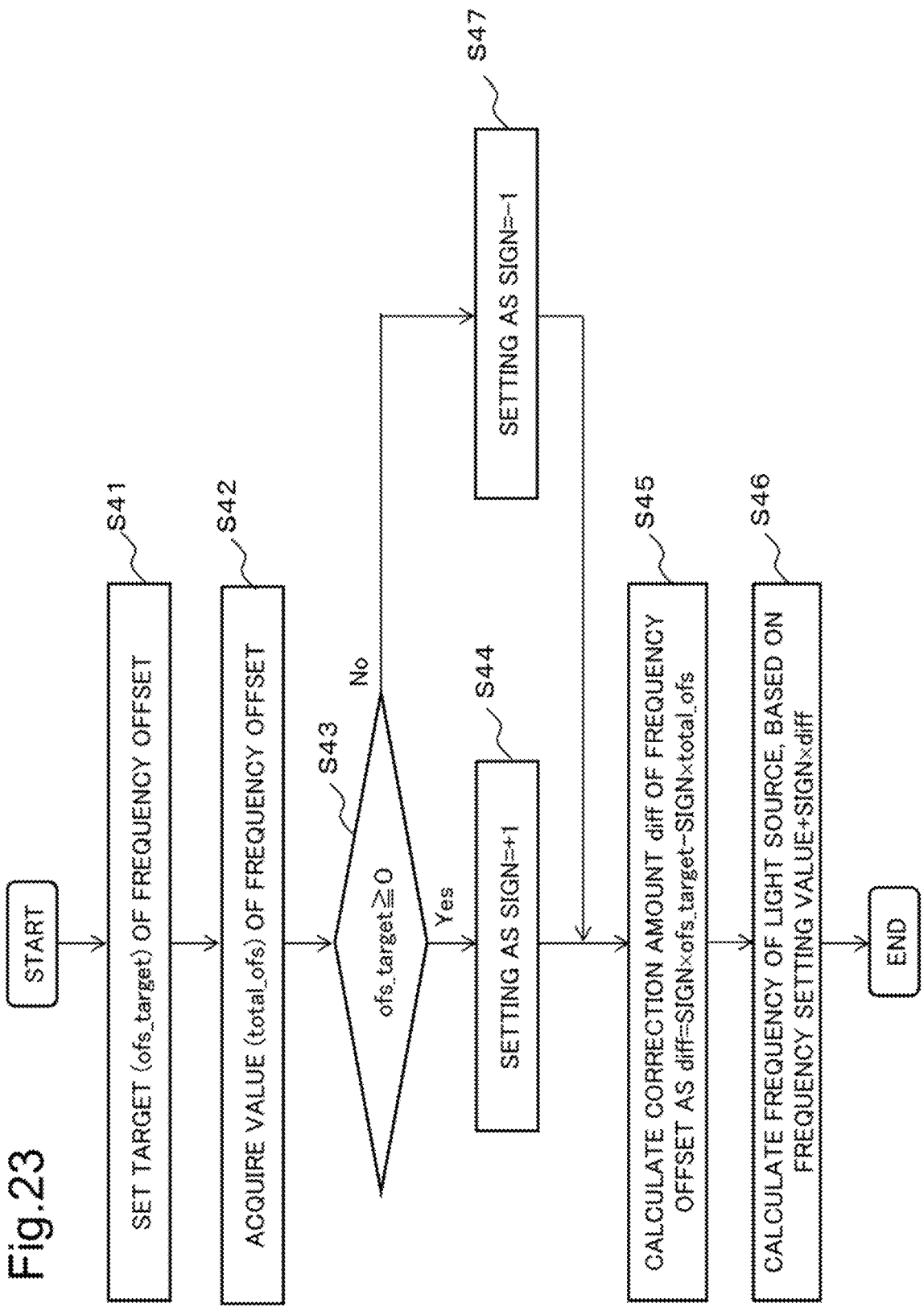
FIG. 23 is a diagram illustrating an operation flow of an optical communication system according to the sixth example embodiment of the present invention.

An operation of the optical communication system according to the present example embodiment is described. The optical communication system according to the present example embodiment operates similarly to the optical communication system according to the second example embodiment in an operation other than adjustment of a frequency offset between an optical signal and local oscillation light. An operation of adjusting a frequency output by the light source unit 14 in the optical transmitter 90 according to the present example embodiment is described. FIG. 23 illustrates an operation flow used when a frequency of light output by the light source unit 14 is adjusted.

First, the frequency adjustment unit 91 sets a target ofs_target for a frequency offset (step S41). The target ofs_target for the frequency offset is referred to as a goal of a difference between the frequency of the light output by the light source unit 14 and a frequency of light output by the local oscillation light output unit 27. The target ofs_target for the frequency offset may be previously stored in the frequency adjustment unit 91, or a set value may be input by a worker or the like.

When the target ofs_target for the frequency offset is set, the frequency adjustment unit 91 acquires data of a frequency offset total_ofs between the optical signal and the local oscillation light (step S42). The data of the frequency offset total_ofs between the optical signal and the local oscillation light are received from the frequency-offset detection unit 101 of the optical receiver 100 via the communication path 202.

The frequency adjustment unit 91 confirms, when receiving the data of the frequency offset total_ofs between the optical signal and the local oscillation light, a positive/negative of the target ofs_target for the frequency offset, and determines a coefficient SIGN used when a correction amount diff of the frequency offset is calculated.

When a value of the target ofs_target of the frequency offset is equal to or more than 0 (Yes in step S43), the frequency adjustment unit 91 sets the coefficient SIGN as adding a value 1 (step S44). When the value of the target ofs_target of the frequency offset is smaller than 0 (No in step S43), the frequency adjustment unit 91 sets the coefficient SIGN as subtracting a value 1 (step S47).

The frequency adjustment unit 91 calculates, when determining the coefficient SIGN used when the correction amount diff is calculated, the correction amount diff of the frequency offset (step S45). The frequency adjustment unit 91 calculates the correction amount diff as diff=SIGN×ofs_target−SIGN×total_ofs.

The frequency adjustment unit 91 calculates, when calculating the correction amount diff of the frequency, a frequency of the light output by the light source unit 14 as a frequency setting value+SIGN×diff (step S46). The frequency adjustment unit 91 controls, when calculating the frequency of the light output by the light source unit 14, the light source unit 14 in such a way as to output light of the calculated frequency.

The optical communication system according to the present example embodiment acquires frequencies of an optical signal and local oscillation light from the frequency-offset detection unit 101, and controls a frequency of light output from the light source unit 14 in such a way that a frequency offset indicating a difference in frequency between the optical signal and the local oscillation light has a set value. In this manner, the frequencies of the optical signal and the local oscillation light are maintained to be the set value other than 0 and the frequency offset is caused between the optical signal and the local oscillation light, and thereby noise generated in a signal of a Q-ch can be reduced. As a result, the optical communication system according to the present example embodiment can reduce an influence of noise generated in a reception signal and maintain reception quality.

Seventh Example Embodiment

Figure 24:
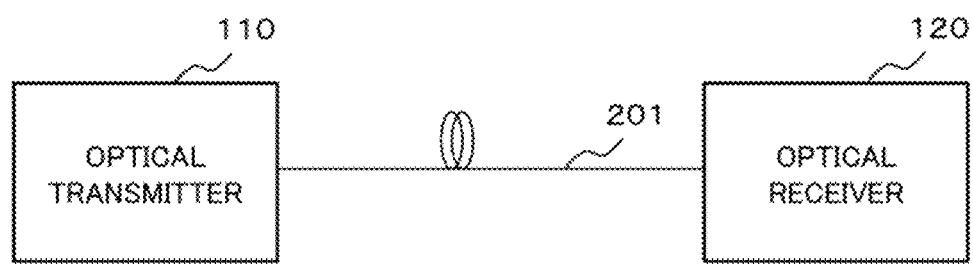
FIG. 24 is a diagram illustrating an outline of a configuration according to a seventh example embodiment of the present invention.

A seventh example embodiment of the present invention is described in detail with reference to drawings. FIG. 24 illustrates an outline of a configuration of an optical communication system according to the present example embodiment. The optical communication system according to the present example embodiment includes an optical transmitter 110 and an optical receiver 120. The optical transmitter 110 and the optical receiver 120 are connected via a communication path 201.

The optical communication system according to the present example embodiment is a network system that performs, similarly to the second example embodiment, optical communication based on a digital coherent method via the communication path 201. In the optical communication system according to the sixth example embodiment, the frequency-offset detection unit 101 monitors processing for a reception signal in the DSP 26 and acquires information on a difference in frequency between an optical signal and local oscillation light, and an optical transmitter adjusts a frequency of an optical signal. The optical communication system according to the present example embodiment is characterized by causing the frequency-offset detection unit 101 to monitor processing for a reception signal in the DSP 26, adjusting a frequency of local oscillation light, and thereby adjusting a frequency offset between an optical signal and the local oscillation light.

Figure 25:
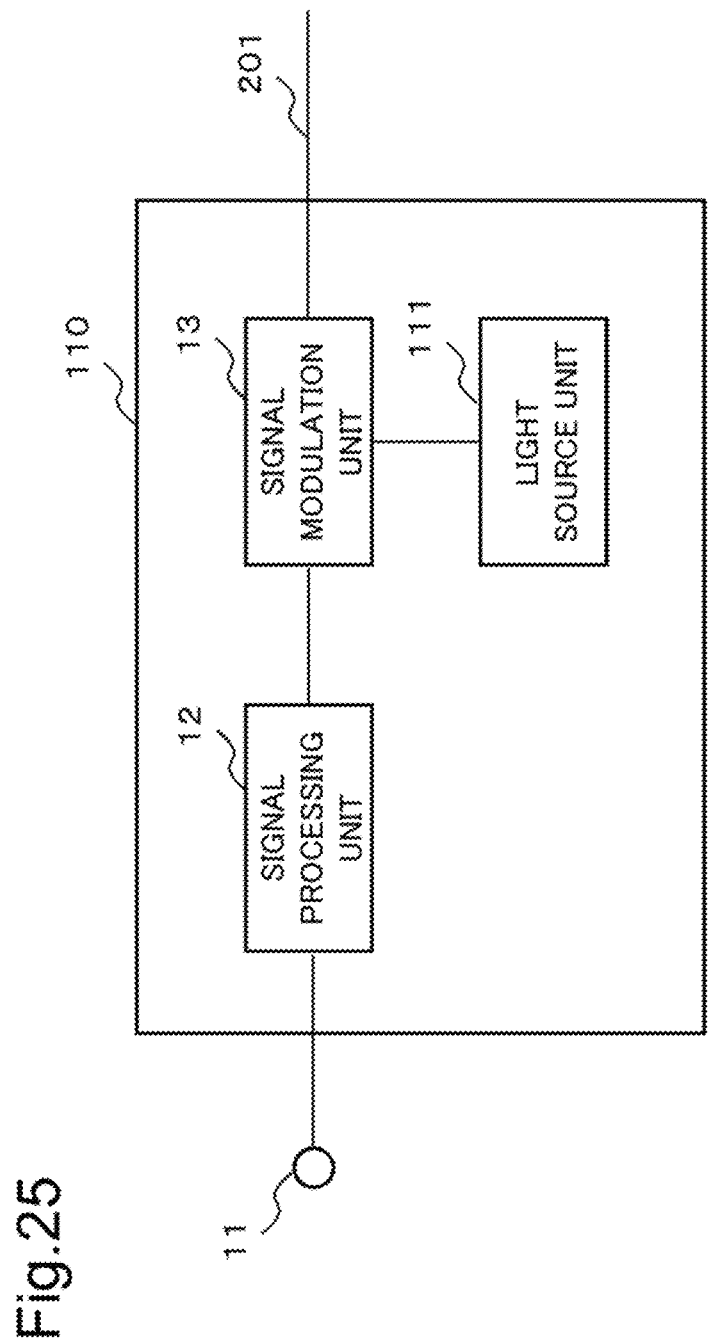
FIG. 25 is a diagram illustrating a configuration of an optical transmitter according to the seventh example embodiment of the present invention.

A configuration of the optical transmitter 110 is described. FIG. 25 illustrates a configuration of the optical transmitter 110 according to the present example embodiment. The optical transmitter 110 includes a client-signal input unit 11, a signal processing unit 12, a signal modulation unit 13, and a light source unit 111. A configuration and a function of each of the client-signal input unit 11, the signal processing unit 12, and the signal modulation unit 13 according to the present example embodiment are similar to a portion of the same name according to the second example embodiment.

The light source unit 111 includes, other than an offset function for a frequency of output light, a function similar to the light source unit 14 according to the second example embodiment. In other words, the light source unit 111 includes a semiconductor laser, and outputs continuous light of a predetermined frequency to the signal modulation unit 13. The predetermined frequency is allocated based on wavelength design of an optical communication network.

Figure 26:
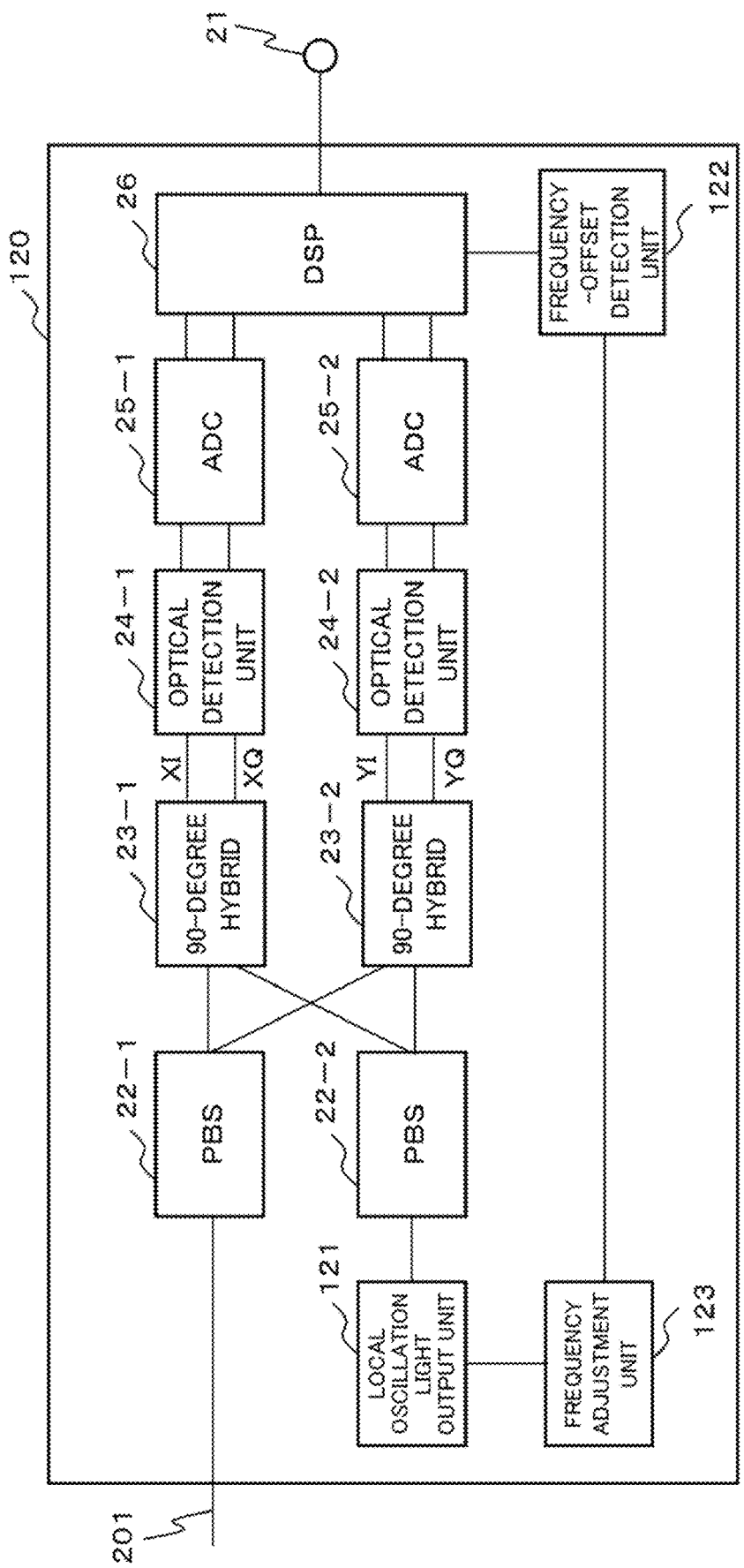
FIG. 26 is a diagram illustrating a configuration of an optical receiver according to the seventh example embodiment of the present invention.

A configuration of the optical receiver 120 is described. FIG. 26 illustrates a configuration of the optical receiver 120 according to the present example embodiment. The optical receiver 120 includes a client-signal output unit 21, a PBS 22, a 90-degree hybrid 23, an optical detection unit 24, an ADC 25, a DSP 26, a local oscillation light output unit 121, a frequency-offset detection unit 122, and a frequency adjustment unit 123.

A configuration and a function of each of the client-signal output unit 21, the PBS 22, the 90-degree hybrid 23, the optical detection unit 24, the ADC 25, and the DSP 26 according to the present example embodiment are similar to a portion of the same name according to the second example embodiment. In other words, as the PBS 22, a PBS 22-1 that polarization-separates an optical signal input via the communication path 201 and a PBS 22-2 that polarization-separates local oscillation light are provided. A 90-degree hybrid 23-1 that processes an X-polarization signal, an optical detection unit 24-1, and an ADC 25-1; and a 90-degree hybrid 23-2 that processes a Y-polarization signal, an optical detection unit 24-2, and an ADC 25-2 are provided.

The local oscillation light output unit 121 generates local oscillation light of a predetermined frequency used when the light is caused to interfere with an optical signal transmitted via the communication path 201 and an optical signal that performs coherent detection is generated. The local oscillation light output unit 121 includes a semiconductor laser, and outputs light of a frequency set based on a frequency of the optical signal transmitted via the communication path 201. The local oscillation light output unit 121 outputs light added with an offset of a frequency by using a predetermined frequency as a center frequency. The offset of a frequency is controlled by the frequency adjustment unit 123.

The frequency-offset detection unit 122 monitors reception processing in the DSP 26, and performs detection for an offset amount between a frequency of an optical signal transmitted by the optical transmitter 110 and a frequency of local oscillation light output by the local oscillation light output unit 121. The frequency-offset detection unit 122 transmits information on the offset amount of the frequency to the frequency adjustment unit 123 of a local device. The frequency-offset detection unit 122 may be integrated with the DSP 26 as a part of the DSP 26.

The frequency adjustment unit 123 controls the offset amount of the frequency of the local oscillation light output by the local oscillation light output unit 121. The frequency adjustment unit 123 controls, based on information on the frequency offset between the optical signal and the local oscillation light transmitted from the frequency-offset detection unit 122, the offset amount of the frequency of the local oscillation light output by the local oscillation light output unit 121.

The communication system according to the present example embodiment operates similarly to the sixth example embodiment, other than adjustment of a frequency offset by control of a frequency of local oscillation light on an optical receiver side. In the optical communication system according to the present example embodiment, the frequency adjustment unit 123 of the optical receiver 120 acquires information on a difference in frequency between an optical signal and local oscillation light detected by the frequency-offset detection unit 122. The frequency adjustment unit 123 adjusts, based on a set value of a frequency offset indicating the difference between the frequency of the optical signal and the frequency of the local oscillation light, a frequency of local oscillation light. The frequency adjustment unit 123 adjusts a frequency of local oscillation light output from the local oscillation light output unit 121 in such a way that a calculated difference in frequency between the optical signal and the local oscillation light is matched with the set value of the frequency offset.

The optical communication system according to the present example embodiment produces an advantageous effect similar to the advantageous effect of the optical communication system according to the sixth example embodiment. In other words, the optical communication system according to the present example embodiment acquires frequencies of an optical signal and local oscillation light from the frequency-offset detection unit 122, and controls a frequency of light output from the local oscillation light output unit 121 in such a way that a frequency offset indicating a difference in frequency between the optical signal and the local oscillation light has a set value. In this manner, the frequencies of the optical signal and the local oscillation light are maintained to be the set value other than 0 and the frequency offset is caused between the optical signal and the local oscillation light, and thereby noise generated in a signal of a Q-ch can be reduced. As a result, the optical communication system according to the present example embodiment can reduce an influence of noise generated in a reception signal and maintain reception quality.

Eighth Example Embodiment

Figure 27:
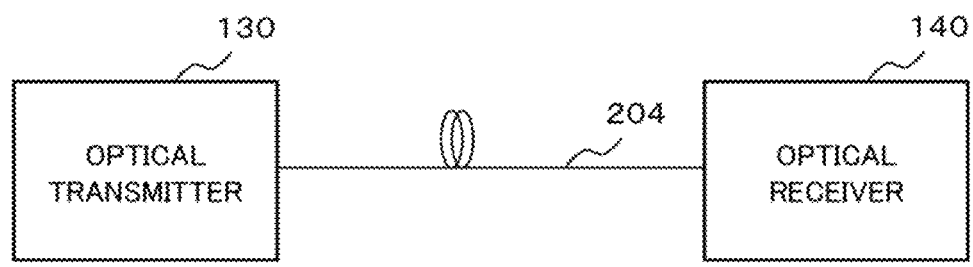
FIG. 27 is a diagram illustrating an outline of a configuration according to an eighth example embodiment of the present invention.

An eighth example embodiment of the present invention is described in detail with reference to drawings. FIG. 27 is a diagram illustrating an outline of a configuration of an optical communication system according to the present example embodiment. The communication system according to the present example embodiment includes an optical transmitter 130 and an optical receiver 140. The optical transmitter 130 and the optical receiver 140 are connected via a communication path 204. The optical communication system according to the present example embodiment is a network system that performs optical communication based on a digital coherent method via the communication path 204 between the optical transmitter 130 and the optical receiver 140.

While a frequency of an optical signal or local oscillation light is adjusted on an optical transmitter side or an optical receiver side, the optical communication system according to the present example embodiment is characterized by adjusting a polarization state of an optical signal and a phase of local oscillation light in an optical receiver and thereby increasing reception quality.

Figure 28:
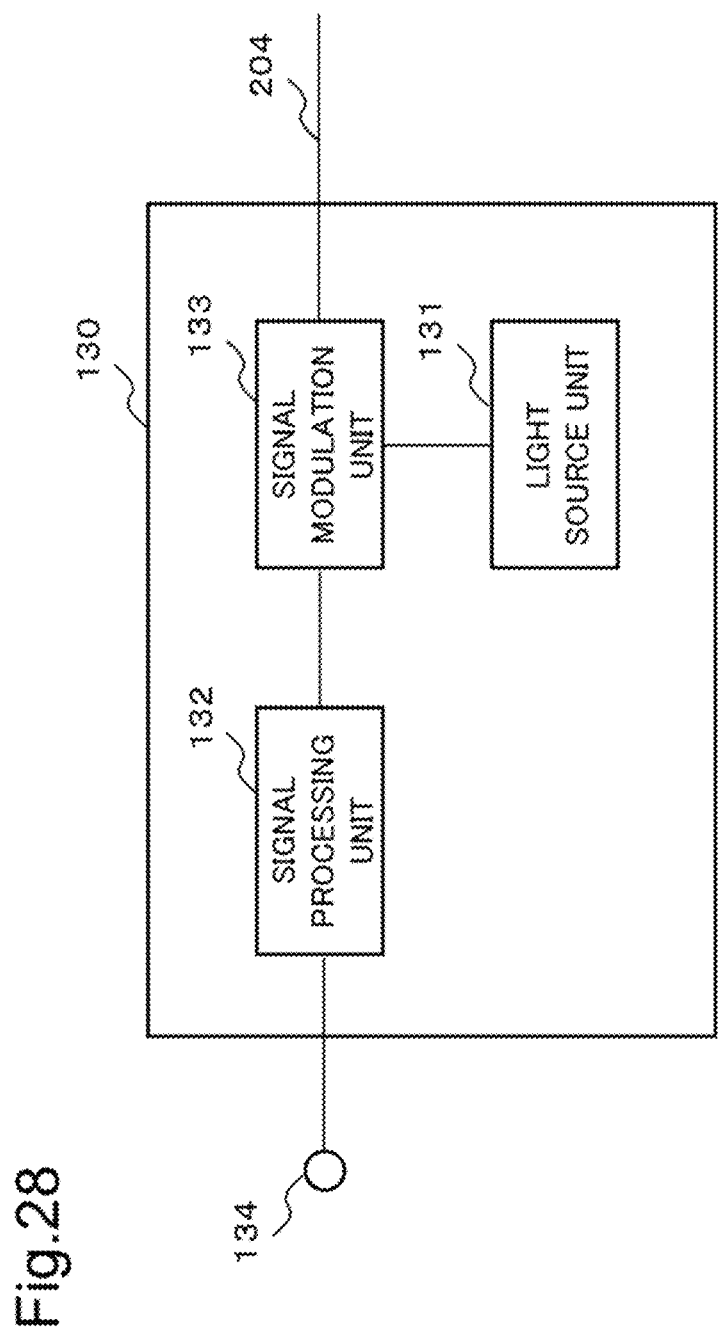
FIG. 28 is a diagram illustrating a configuration of an optical transmitter according to the eighth example embodiment of the present invention.

A configuration of the optical transmitter 130 is described. FIG. 28 is a diagram illustrating a configuration of the optical transmitter 130 according to the present example embodiment. The optical transmitter 130 includes a light source unit 131, a signal processing unit 132, a signal modulation unit 133, and a client-signal input unit 134.

The light source unit 131 outputs continuous light of a predetermined frequency to the signal modulation unit 133. The predetermined frequency is allocated based on wavelength design of an optical communication network.

The signal processing unit 132 executes processing such as redundancy for an input client signal, and maps the processed signal in a frame used when the signal is transmitted through the communication path 201.

The signal modulation unit 133 performs modulation, based on a signal input from the signal processing unit 132, light input from the light source unit 131, and generates an optical signal to be transmitted to the communication path 204. The signal modulation unit 133 according to the present example embodiment performs modulation, for example, based on a BPSK modulation method. A modulation method may be another multi-value modulation method such as QPSK and 8-QAM other than BPSK.

The client-signal input unit 134 is an input port of a client signal transmitted via the communication path 204. A client signal input to the client-signal input unit 134 is transmitted to the signal processing unit 132.

Figure 29:
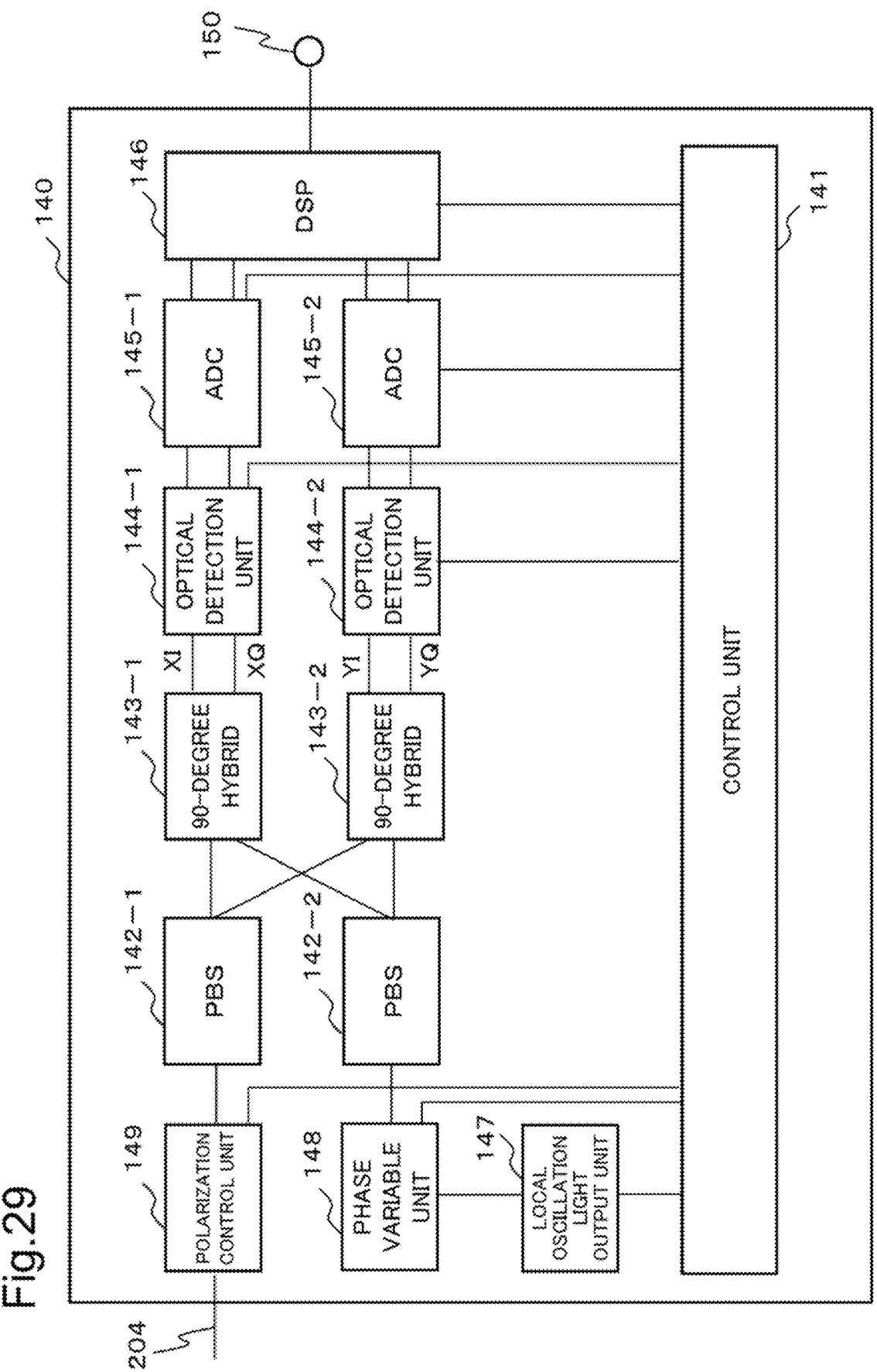
FIG. 29 is a diagram illustrating a configuration of an optical receiver according to the eighth example embodiment of the present invention.

A configuration of the optical receiver 140 is described. FIG. 29 illustrates a configuration of the optical receiver 140 according to the present example embodiment. The optical receiver 140 includes a control unit 141, a PBS 142, a 90-degree hybrid 143, and an optical detection unit 144. The optical receiver 140 further includes an ADC 145, a DSP 146, a local oscillation light output unit 147, a phase variable unit 148, a polarization control unit 149, and a client-signal output unit 150.

The control unit 141 includes a function of adjusting polarization rotation of an optical signal in the polarization control unit 149 and controlling an adjustment operation for a phase of local oscillation light in the phase variable unit 148. The control unit 141 monitors power of an optical signal in the optical detection unit 144 and a gain of a transimpedance amplifier (TIA) that amplifies an electric signal converted from the optical signal, power of a signal in the ADC 145, and a bit error ratio (BER) in the DSP 146. The control unit 141 adds a variation to the phase of the local oscillation light and polarization rotation of the optical signal in such a way that a BER is smaller than a predetermined reference.

The PBS 142 polarization-separates an input optical signal, and outputs the separated signals. The PBS 142 includes a PBS 142-1 that polarization-separates an optical signal and a PBS 142-2 that polarization-separates local oscillation light. The PBS 142-1 polarization-separates the optical signal input via the communication path 204, outputs an X-polarized wave to a 90-degree hybrid 143-1, and transmits a Y-polarized wave to a 90-degree hybrid 143-2. The PBS 142-2 polarization-separates light input via the local oscillation light output unit 147, outputs an X-polarized wave to the 90-degree hybrid 143-1, and transmits a Y-polarized wave to the 90-degree hybrid 143-2.

The 90-degree hybrid 143 multiplexes the input optical signal with the input local oscillation light through two paths different in phase by 90 degrees. The 90-degree hybrid 143-1 multiplexes an X-polarization component of the optical signal input from the PBS 142-1 with an X-polarization component of the local oscillation light input from the PBS 142-2 through two paths different in phase by 90 degrees.

The 90-degree hybrid 143-1 transmits, to an optical detection unit 144-1, signals of an I-phase component and a Q-phase component generated by multiplexing the optical signal with the local oscillation light through paths different in phase by 90 degrees. The 90-degree hybrid 143-2 multiplexes a Y-polarization component of the optical signal input from the PBS 142-1 with a Y-polarization component of the local oscillation light input from the PBS 142-2 through two paths different in phase by 90 degrees. The 90-degree hybrid 143-2 transmits, to an optical detection unit 144-2, signals of an I-phase component and a Q-phase component generated by multiplexing the optical signal with the local oscillation light through paths different in phase by 90 degrees.

The optical detection unit 144 converts the input optical signal to an electric signal, and outputs the electric signal. The optical detection unit 144 is configured by using a photodiode. The optical detection unit 144 includes a TIA that amplifies an electric signal converted from an optical signal. The detection unit 144-1 converts the optical signal of each of the I-phase component and the Q-phase component of the X-polarized wave input from the 90-degree hybrid 143-1 to an electric signal, and transmits the electric signal to the ADC 145-1. The optical detection unit 144-2 converts the optical signal of each of the I-phase component and the Q-phase component of the Y-polarized wave input from the 90-degree hybrid 143-2 to an electric signal, and transmits the electric signal to the ADC 145-2.

The ADC 145 converts an input analog signal to a digital signal. The ADC 145-1 converts an analog signal input from the optical detection unit 144-1 to a digital signal, and transmits the digital signal to the DSP 146. The ADC 145-2 converts an analog signal input from the optical detection unit 144-2 to a digital signal, and transmits the digital signal to the DSP 146.

The DSP 146 executes reception processing such as distortion correction, decoding and error correction for an input signal, and demodulates a client signal. The DSP 146 is configured by a semiconductor device. A reception processing function of the DSP 146 may be configured by using an FPGA. The reception processing function of the DSP 146 may be performed by causing a general-purpose processor such as a CPU to execute a computer program. The DSP 146 transmits the demodulated client signal to the client-signal output unit 150.

The local oscillation light output unit 147 multiplexes an optical signal transmitted via the communication path 204 with local oscillation light, and generates local oscillation light used when an optical signal of a frequency relevant to a frequency difference between an optical signal and local oscillation light is generated. The local oscillation light output unit 147 includes a semiconductor laser, and outputs light of a frequency set based on a frequency of the optical signal transmitted via the communication path 204.

The phase variable unit 148 includes a function of changing a phase of local oscillation light. The phase variable unit 148 adds, based on control of the control unit 141, a variation to a phase of local oscillation light.

The polarization control unit 149 includes a function of adding a variation to a polarization state of an optical signal.

The polarization control unit 149 adds, based on control of the control unit 141, polarization rotation to an optical signal.

The communication path 204 is configured as an optical communication network using an optical fiber. The communication path 204 transmits an optical signal in a direction of the optical receiver 140 from the optical transmitter 130.

An operation of the optical communication system according to the present example embodiment is described. A client signal input to the client-signal input unit 134 of the optical transmitter 130 is transmitted to the signal processing unit 132.

When the client signal is input, the signal processing unit 132 maps the client signal in a frame used when the client signal is transmitted through the communication path 204. When the mapping is performed, the signal processing unit 132 transmits the mapped signal to the signal modulation unit 133.

When a signal based on data of a frame subjected to mapping is input, the signal modulation unit 133 performs modulation, based on the data of the frame input from the signal processing unit 132, light output from the light source unit 131. The signal modulation unit 133 performs, for example, by using a BPSK method, conversion from an electric signal to an optical signal. The signal modulation unit 133 performs modulation, for example, based on a BPSK modulation method. The signal modulation unit 133 may be configured in such a way as to perform conversion from an electric signal to an optical signal, based on another multi-value modulation method such as QPSK and 8-QAM other than BPSK. The signal modulation unit 133 transmits the optical signal generated by performing modulation to the communication path 204.

The optical signal transmitted to the communication path 204 is transmitted through the communication path 204, and is transmitted to the optical receiver 140. The optical signal received in the optical receiver 140 is input to the polarization control unit 149. When the optical signal is input, the polarization control unit 149 performs, based on control of the control unit 141, polarization rotation for the optical signal. The optical signal subjected to polarization rotation is transmitted to the PBS 142-1.

When the optical signal is input, the PBS 142-1 polarization-separates the input optical signal, transmits an X-polarization optical signal to the 90-degree hybrid 143-1, and transmits a Y-polarization optical signal to the 90-degree hybrid 143-2.

The local oscillation light output unit 147 generates local oscillation light, and outputs the generated light to the phase variable unit 148. When the local oscillation light is input, the phase variable unit 148 adds, based on control of the control unit 141, a variation to a phase of the local oscillation light. The phase variable unit 148 transmits, to the PBS 142-2, the local oscillation light to a phase of which a variation is added.

When the optical signal is input from the PBS 142-1, the 90-degree hybrid 143-1 and the 90-degree hybrid 143-2 multiplex the optical signal input from the PBS 142-1 with the local oscillation light input from the PBS 142-2, and generate signals relevant to an I-phase component and a Q-phase component. The 90-degree hybrid 143-1 and the 90-degree hybrid 143-2 transmit the generated optical signals to the optical detection unit 144-1 and the optical detection unit 144-2.

When the optical signal is input, the optical detection unit 144-1 and the optical detection unit 144-2 each convert the input optical signal to an electric signal, and transmit the electric signal to the ADC 145-1 and the ADC 145-2. When the electric signal converted from the optical signal is input, the ADC 145-1 and the ADC 145-2 convert the input signal to a digital signal, and transmit the digital signal to the DSP 146.

When the signal is input to the DSP 146, the DSP 146 executes reception processing for the input signal, demodulates a client signal, and transmits the demodulated client signal to the client-signal output unit 150. The client-signal output unit 150 outputs the input client signal to a communication network or a communication device.

While the reception processing is executed in the DSP 146, the control unit 141 monitors error correction processing in the DSP 146 and measures the number of errors in the received signal. The control unit 141 according to the present example embodiment calculates the number of errors as a BER. The control unit 141 confirms, when calculating the BER, whether the calculated BER falls within a predetermined reference. When the calculated BER is equal to or less than the predetermined reference, the control unit 141 continues, without changing a set value, adjusting a phase of local oscillation light and controlling polarization rotation for an optical signal.

When the calculated BER is larger than a predetermined reference, the control unit 141 changes an adjustment amount for a phase of local oscillation light and a polarization rotation amount for an optical signal. The adjustment amount for a phase of local oscillation light and the polarization rotation amount for an optical signal are previously set based on a change amount of the BER. The optical receiver 140 controls, based on the BER, the adjustment amount for a phase of local oscillation light and the polarization rotation amount for an optical signal and thereby can stabilize the reception processing.

Figure 30A:
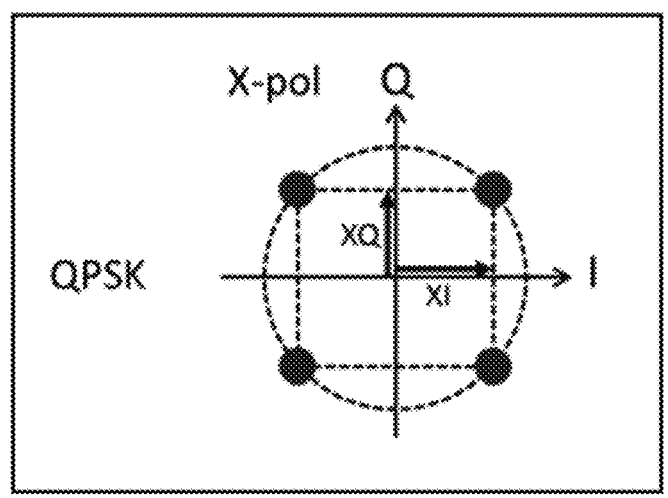
FIG. 30A is a diagram illustrating an example of a constellation in the multi-value modulation method.
Figure 30B:
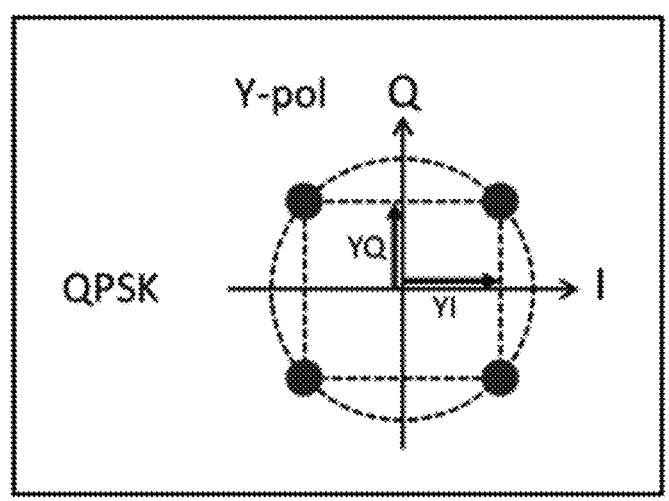
FIG. 30B is a diagram illustrating an example of a constellation in the multi-value modulation method.
Figure 30C:
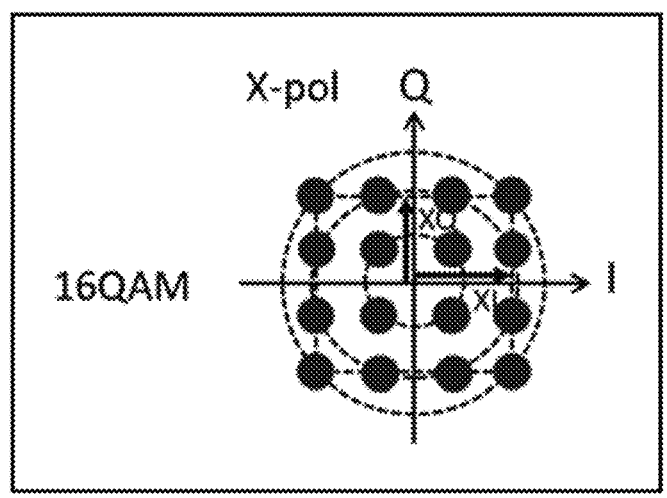
FIG. 30C is a diagram illustrating an example of a constellation in the multi-value modulation method.
Figure 30D:
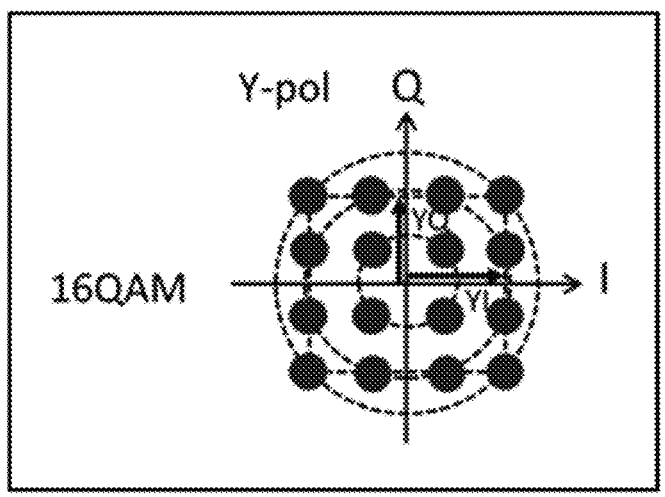
FIG. 30D is a diagram illustrating an example of a constellation in the multi-value modulation method.

A case where a modulation method for an optical signal is multi-value modulation for four values or more is described. When a modulation method for an optical signal is multi-value modulation for four values or more, a component of a symbol included in a reception signal is in a state where, as illustrated in FIGS. 30A, 30B, 30C, and 30D, an X-polarization I-component, an X-polarization Q-component, a Y-polarization I-component, and a Y-polarization Q-component are included. As a multi-value modulation method for four values or more, for example, polarization multiplexing-quadrature phase shift keying (PM-QPSK) illustrated as FIGS. 30A and 30B and polarization multiplexing-sixteen quadrature amplitude modulation (PM-16QAM) illustrated as FIGS. 30C and 30D are used.

The above-described four components each coherent-received with local oscillation light include a certain signal component. The above-described four components each are converted by the optical detection unit 144 to an electric signal and the electric signal is amplified by the TIA, and thereafter the amplified signal is sampled as a digital signal in the ADC 145. The DSP 146 demodulates, based on the signal sampled as a digital signal, an electric information signal by digital signal processing.

However, when a modulation method for an optical signal is multi-value modulation for values smaller than four values, depending on a polarization state of a reception signal, a phase of local oscillation light, and the like, one component or two components may be in a state of being close to substantially 0 among a photoelectrically converted X-polarization I-component, X-polarization Q-component, Y-polarization I-component, and Y-polarization Q-component. As multi-value modulation for values smaller than four values, for example, polarization multiplexing-binary phase shift keying (PM-BPSK) and the like is used.

Figure 31A:
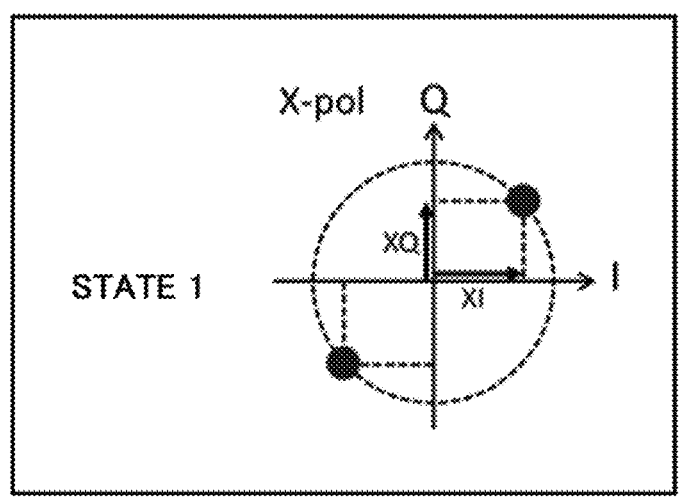
FIG. 31A is a diagram illustrating an example of a constellation in the multi-value modulation method.
Figure 31B:
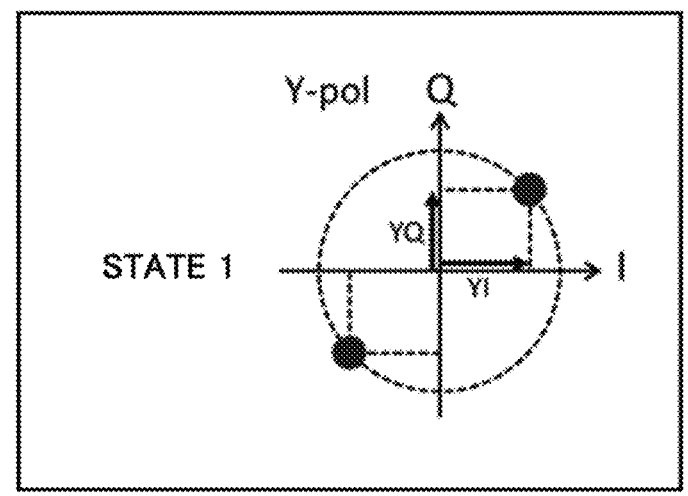
FIG. 31B is a diagram illustrating an example of a constellation in the multi-value modulation method.
Figure 31C:
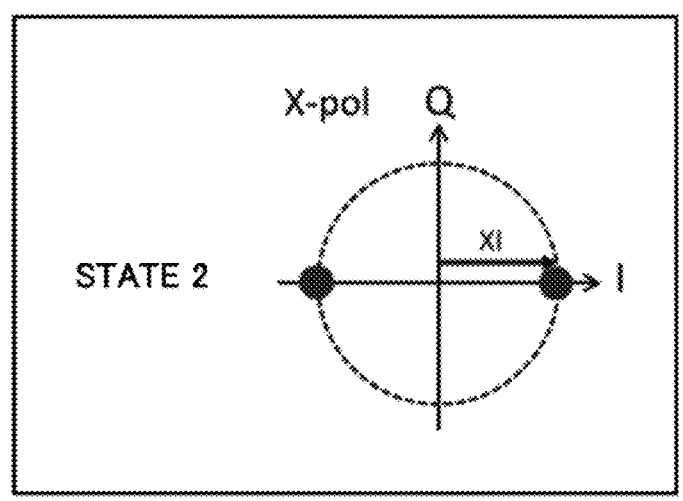
FIG. 31C is a diagram illustrating an example of a constellation in the multi-value modulation method.
Figure 31D:
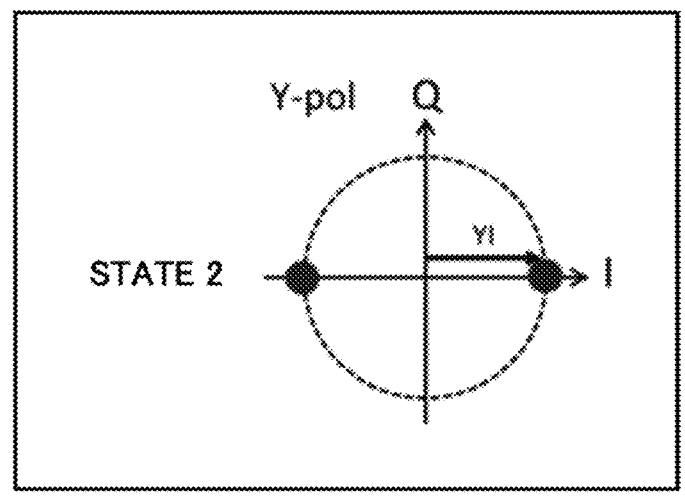
FIG. 31D is a diagram illustrating an example of a constellation in the multi-value modulation method.

FIGS. 31A, 31B, 31C, and 32D each illustrate a constellation in polarization multiplexing-binary phase shift keying method. While in FIGS. 31A and 31B, both two components have a value other than 0, in FIGS. 31C and 31D, both two components are in a state of being close to substantially 0.

Figure 32:
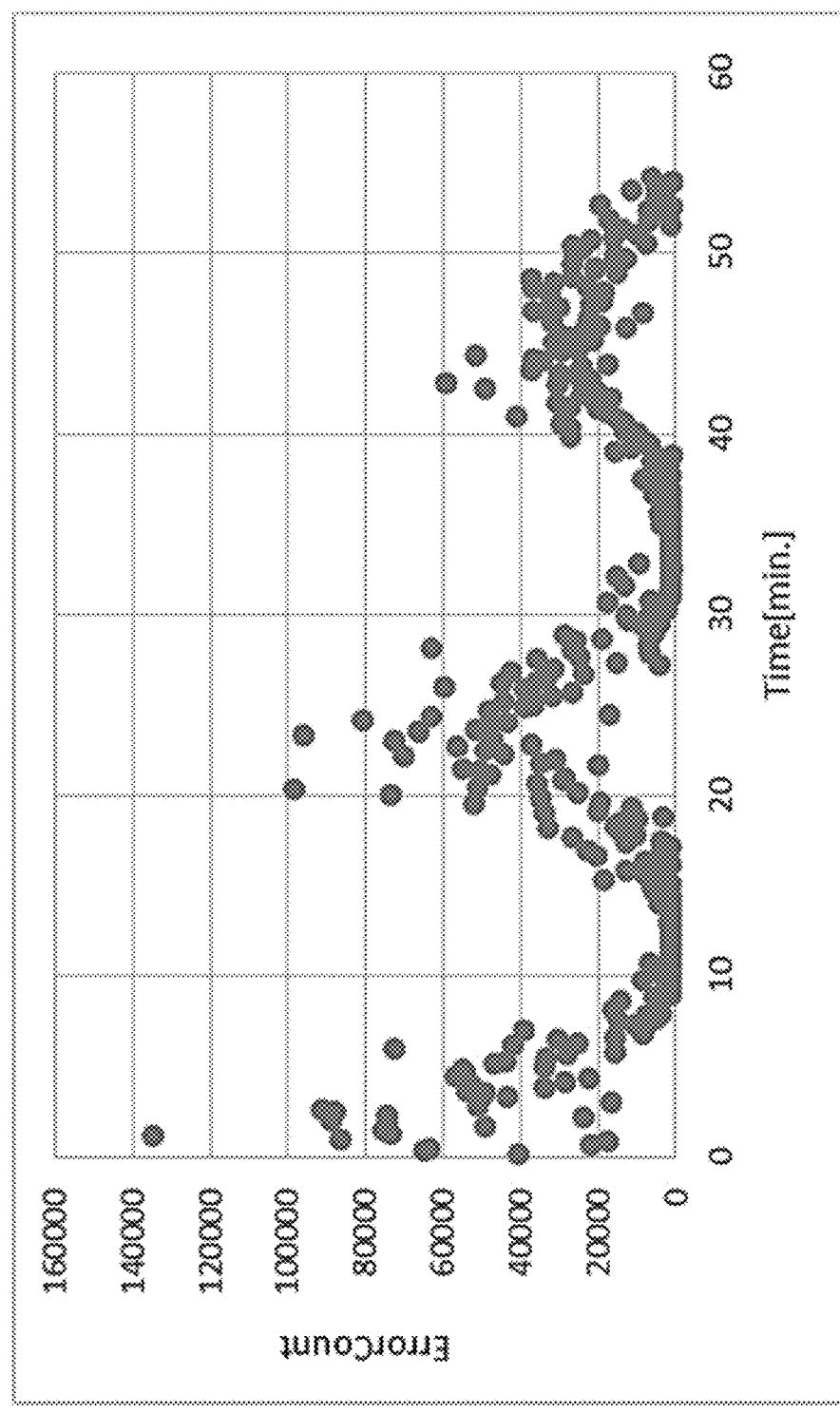
FIG. 32 is a diagram illustrating an example of a temporal change of the number of error occurrences.

In a channel where a signal is close to 0, when amplification is performed by a TIA, an electric noise component is amplified. In a channel where a signal is close to 0, a noise component is larger than in a channel where a signal component exists. Therefore, in a channel where a signal is close to 0, a reception SNR is worsened and a reception BER affected by an SNR may be worsened. FIG. 32 illustrates an example in which a temporal change of a BER in a channel where a signal is close to 0 is observed.

Figure 33A:
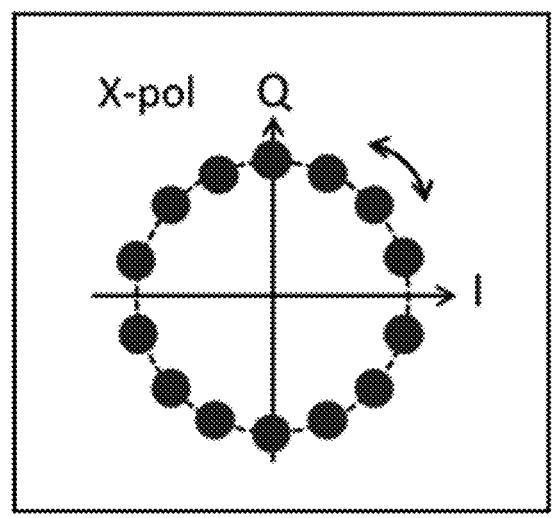
FIG. 33A is a diagram illustrating an example of a constellation in the multi-value modulation method.
Figure 33B:
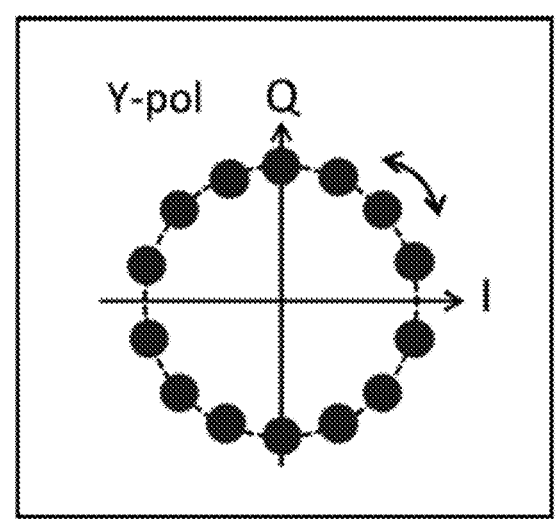
FIG. 33B is a diagram illustrating an example of a constellation in the multi-value modulation method.

In order to reduce worsening of a BER, it is effective to provide a minute variation for an optical signal or local oscillation light being received in such a way as not to be a specific polarization state, a frequency of local oscillation light, or a phase condition. FIGS. 33A and 33B each illustrate a state of a demodulation symbol of polarization multiplexing-binary phase modulation light in which a minute variation is provided to a phase of local oscillation light.

In FIGS. 33A and 33B, four signal (XI, XQ, YI, and YQ) components in an optical detection unit and an ADC vary with a certain value. Therefore, a noise component is not excessively amplified in a TIA, and therefore excessive degradation of a BER can be reduced. An influence due to the minute variation is compensated by a frequency-offset compensation function in the digital signal processing, and therefore an influence on a BER does not occur. An example of a result acquired by observing a temporal change of a BER when a minute variation is provided is illustrated in FIG. 34. Excessive BER degradation occurring in FIG. 32 is reduced, and thereby a stable characteristic is achieved. In this manner, a minute variation is added to a phase of local oscillation light of an optical receiver, and thereby a stable reception characteristic can be achieved even when polarization multiplexing-binary phase modulation light is received.

An application may be possible to intensity modulation of a non-return-to-zero (NRZ) signal, a return-to-zero (RZ) signal, or the like and a modulation method in which phase modulation and intensity modulation are combined such as m-value quadrature amplitude modulation (m-QAM) and the like.

The optical communication system according to the present example embodiment adjusts a phase of local oscillation light and controls polarization rotation of an optical signal on a reception side. For such a configuration, when a frequency of a light source on a transmission side is varied, a shift of a signal occupancy band for an optical filter band of wavelength multiplexing/demultiplexing mounted on an ROADM and the like occurs, and signal degradation due to spectrum constriction may occur. When a frequency of an optical signal on a transmission side or a light source of local oscillation light is varied, a penalty may occur with respect to frequency-offset compensation processing in digital signal processing. In contrast, when a configuration such as an optical communication system according to the present example embodiment is made, signal degradation and the like can be reduced, and thereby stable reception processing can be executed.

The optical communication system according to the present example embodiment adjusts a phase of local oscillation light and adjusts polarization rotation of an input optical signal, based on a BER detected in the control unit 141 of the optical receiver 140. When a phase of local oscillation light and a polarization state of an optical signal are adjusted in such a way as to cause a BER to have an appropriate value, an influence of noise occurring in a reception signal can be reduced and reception quality can be maintained.

Figure 35:
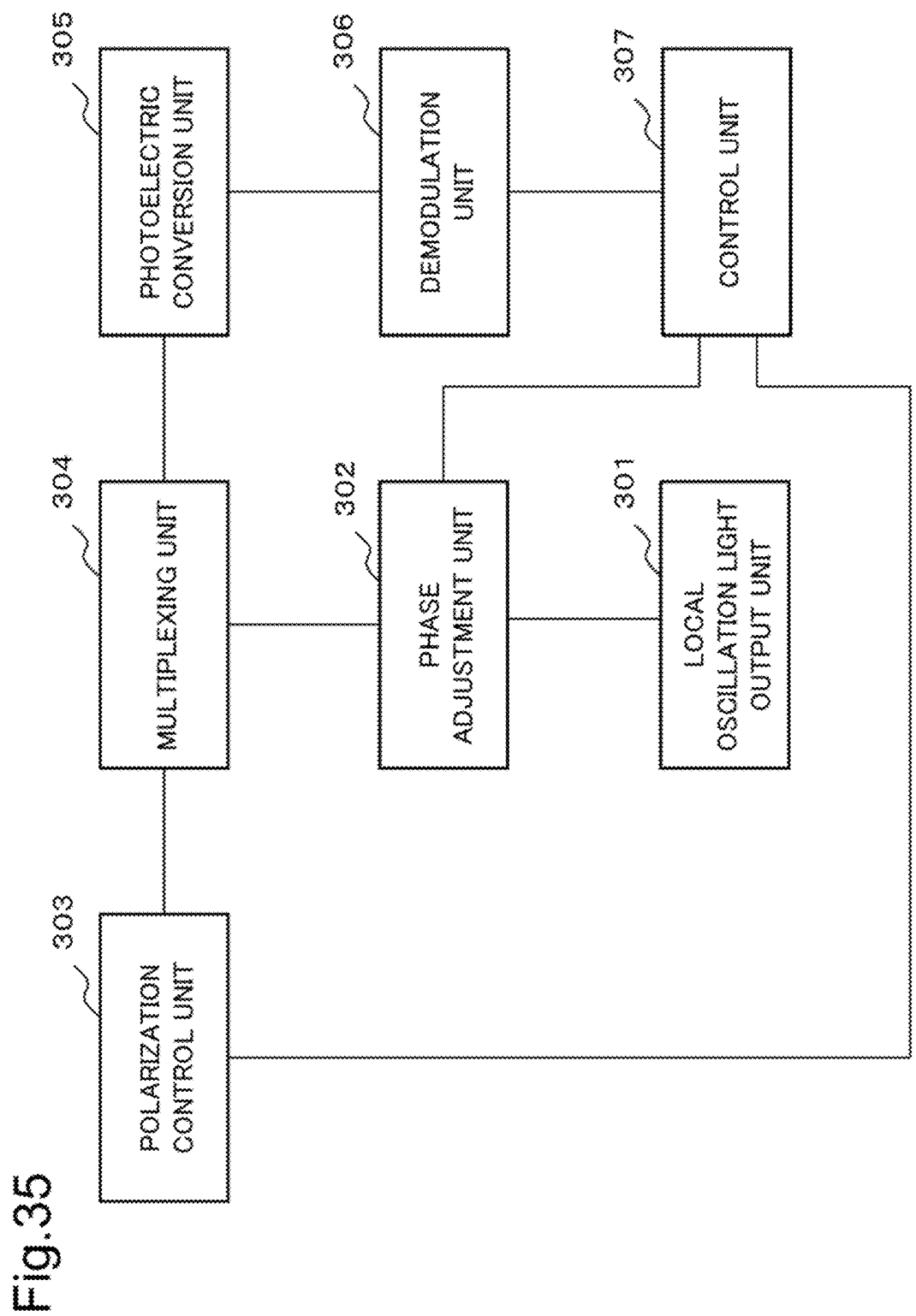
FIG. 35 is a diagram illustrating an example of another configuration of an optical receiver according to the present invention.

The optical receiver according to the eighth example embodiment may be configured as in FIG. 35. An optical receiver in FIG. 35 includes a local oscillation light output unit 301, a phase adjustment unit 302, a polarization control unit 303, a multiplexing unit 304, a photoelectric conversion unit 305, a demodulation unit 306, and a control unit 307.

The local oscillation light output unit 301 outputs local oscillation light of a frequency set based on a frequency of an input optical signal. The phase adjustment unit 302 adjusts a phase of the local oscillation light. The polarization control unit 303 controls polarization rotation of an optical signal. The multiplexing unit 304 multiplexes the local oscillation light output from the phase adjustment unit 302 with the optical signal output from the polarization control unit 303. The photoelectric conversion unit 305 converts the optical signal multiplexed by the multiplexing unit 304 to an electric signal. The demodulation unit 306 executes demodulation processing, based on the electric signal converted by the photoelectric conversion unit 305. The control unit 307 controls, based on information on a reception status of the optical signal, execution of at least one of adjustment of a phase of the local oscillation light in the phase adjustment unit 302 and polarization rotation of the optical signal in the polarization control unit 303.

The optical receiver in FIG. 35 controls, based on information on a reception status of an optical signal, execution of at least one of adjustment of a phase of local oscillation light in the phase adjustment unit 302 and polarization rotation of an optical signal in the polarization control unit 303. When such control is performed, the optical receiver according to the present example embodiment can maintain reception quality enabling stable reception processing.

In the optical communication system according to the second to eighth example embodiments, a configuration in which unidirectional communication that transmits an optical signal from an optical transmitter to an optical receiver is performed is described. Instead of such a configuration, bidirectional optical communication may be performed in the optical communication system according to the example embodiments. When bidirectional optical communication is performed, a frequency offset being a difference in frequency between an optical signal and local oscillation light is controlled for each direction. When bidirectional communication is performed, information such as error information, information on a frequency of light, and information on a frequency difference between an optical signal and local oscillation light may be transmitted by being added in a frame transmitted to an opposite device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-167935, filed on Sep. 7, 2018, the disclosure of which is incorporated herein in its entirety by reference.

REFERENCE SIGNS LIST

1 Optical output unit
2 Optical modulation unit

3 Reception information acquisition unit
4 Frequency adjustment unit
10 Optical transmitter
11 Client-signal input unit
12 Signal processing unit
13 Signal modulation unit
14 Light source unit
15 Frequency adjustment unit
20 Optical receiver
21 Client-signal output unit
22 PBS
23 90-degree hybrid
24 Optical detection unit
25 ADC
26 DSP
27 Local oscillation light output unit
28 Error detection unit
30 Optical transmitter
31 Light source unit
40 Optical receiver
41 Local oscillation light output unit
42 Error detection unit
43 Frequency adjustment unit
50 Optical transmitter
51 Frequency monitor unit
52 Frequency adjustment unit
60 Optical receiver
61 Frequency monitor unit
70 Optical transmitter
71 Light source unit
72 Frequency monitor unit
80 Optical receiver
81 Frequency monitor unit
82 Frequency adjustment unit
90 Optical transmitter
91 Frequency adjustment unit
100 Optical receiver
101 Frequency-offset detection unit
110 Optical transmitter
111 Light source unit
120 Optical receiver
121 Local oscillation light output unit
122 Frequency-offset detection unit
123 Frequency adjustment unit
130 Optical transmitter
131 Light source unit
132 Signal processing unit
133 Signal modulation unit
134 Client-signal input unit
140 Optical receiver
141 Control unit
142 PBS
143 90-degree hybrid
144 Optical detection unit
145 ADC
146 DSP
147 Local oscillation light output unit
148 Phase variable unit
149 Polarization control unit
150 Client-signal output unit
201 Communication path
202 Communication path
203 Communication path
204 Communication path
301 Local oscillation light output unit
302 Phase adjustment unit
303 Polarization control unit
304 Multiplexing unit
305 Photoelectric conversion unit
306 Demodulation unit
307 Control unit

The invention claimed is:

1. An optical receiver comprising:
a local oscillation light output unit configured to output local oscillation light of a frequency being set based on a frequency of an optical signal to be inputted, the optical signal being polarization multiplexing-binary phase modulation light;
a phase adjustment unit configured to adjust a phase of the local oscillation light;
a polarization control unit configured to control polarization rotation of the optical signal;
a multiplexing unit configured to multiplex the local oscillation light output from the phase adjustment unit with the optical signal output from the polarization control unit;
a photoelectric conversion unit configured to convert the optical signal multiplexed by the multiplexing unit into an electric signal;
a demodulation unit configured to execute demodulation processing, based on the electric signal converted by the photoelectric conversion unit; and
a control unit configured to add a variation to at least one of a phase of the local oscillation light in the phase adjustment unit and polarization rotation of the optical signal in the polarization control unit,
wherein the photoelectric conversion unit includes a transimpedance amplifier that amplifies the electric signal, and
the control unit adds the variation in such a way as not to be a specific polarization or phase condition where a signal inputted into the transimpedance amplifier is close to zero.

2. The optical receiver according to claim 1, wherein the control unit controls execution of at least one of adjustment of a phase of the local oscillation light and polarization rotation of the optical signal in such a way as to optimize a predetermined indicator of reception quality of the optical signal.

3. The optical receiver according to claim 2, wherein the control unit controls execution of at least one of adjustment of a phase of the local oscillation light and polarization rotation of the optical signal in such a way as to minimize a number of errors detected by the demodulation unit.

4. The optical receiver according to claim 3, wherein the control unit controls execution of at least one of adjustment of a phase of the local oscillation light and polarization rotation of the optical signal in such a way as to rotate a constellation of a signal during demodulation.

5. The optical receiver according to claim 3, further comprising
a monitor unit configured to monitor each power of an in-phase component and a quadrature component of a polarized wave, being orthogonal to each other, of a signal acquired by multiplexing the local oscillation light with the optical signal, wherein
the control unit determines, based on the power, the reception status.

6. The optical receiver according to claim 2, further comprising
a monitor unit configured to monitor each power of an in-phase component and a quadrature component of a polarized wave, being orthogonal to each other, of a signal acquired by multiplexing the local oscillation light with the optical signal, wherein the control unit determines, based on the power, the reception status.

7. The optical receiver according to claim 2, wherein the control unit controls execution of at least one of adjustment of a phase of the local oscillation light and polarization rotation of the optical signal in such a way as to rotate a constellation of a signal during demodulation.

8. The optical receiver according to claim 1, wherein the control unit controls execution of at least one of adjustment of a phase of the local oscillation light and polarization rotation of the optical signal in such a way as to rotate a constellation of a signal during demodulation.

9. The optical receiver according to claim 8, further comprising
a monitor unit configured to monitor each power of an in-phase component and a quadrature component of a polarized wave, being orthogonal to each other, of a signal acquired by multiplexing the local oscillation light with the optical signal, wherein
the control unit determines, based on the power, the reception status.

10. A communication system comprising:
an optical transmitter including a unit configured to transmit an optical signal acquired by modulating each of an in-phase component and a quadrature component, being orthogonal to each other, of a polarized wave; and
an optical receiver,
wherein the optical receiver includes
a local oscillation light output unit configured to output local oscillation light of a frequency being set based on a frequency of an optical signal to be inputted, the optical signal being polarization multiplexing-binary phase modulation light;
a phase adjustment unit configured to adjust a phase of the local oscillation light;
a polarization control unit configured to control polarization rotation of the optical signal;
a multiplexing unit configured to multiplex the local oscillation light output from the phase adjustment unit with the optical signal output from the polarization control unit;
a photoelectric conversion unit configured to convert the optical signal multiplexed by the multiplexing unit into an electric signal;
a demodulation unit configured to execute demodulation processing, based on the electric signal converted by the photoelectric conversion unit; and
a control unit configured to add a variation to at least one of a phase of the local oscillation light in the phase adjustment unit and polarization rotation of the optical signal in the polarization control unit,
wherein the polarization control unit of the optical receiver performs polarization rotation of the optical signal received from the optical transmitter through a communication path,
the photoelectric conversion unit includes a transimpedance amplifier that amplifies the electric signal, and
the control unit adds the variation in such a way as not to be a specific polarization or phase condition where a signal inputted into the transimpedance amplifier is close to zero.

11. The communication system according to claim 10, wherein the control unit controls execution of at least one of adjustment of a phase of the local oscillation light and polarization rotation of the optical signal in such a way as to optimize a predetermined indicator of reception quality of the optical signal.

12. The communication system according to claim 11, wherein the control unit controls execution of at least one of adjustment of a phase of the local oscillation light and polarization rotation of the optical signal in such a way as to minimize a number of errors detected by the demodulation unit.

13. The communication system according to claim 11, further comprising
a monitor unit configured to monitor each power of an in-phase component and a quadrature component of a polarized wave, being orthogonal to each other, of a signal acquired by multiplexing the local oscillation light with the optical signal, wherein
the control unit determines, based on the power, the reception status.

14. The communication system according to claim 10, wherein the control unit controls execution of at least one of adjustment of a phase of the local oscillation light and polarization rotation of the optical signal in such a way as to rotate a constellation of a signal during demodulation.

15. A receiving method comprising:
outputting local oscillation light of a frequency being set based on a frequency of an optical signal to be inputted, the optical signal being polarization multiplexing-binary phase modulation light;
multiplexing the local oscillation light subjected to phase adjustment with the optical signal subjected to polarization rotation;
converting the multiplexed optical signal into an electric signal;
executing demodulation processing, based on the converted electric signal; and
adding a variation to at least one of a phase of the local oscillation light and polarization rotation of the optical signal,
wherein the converting of the multiplexed optical signal includes amplifying the electric signal, and
the adding of the variation includes adding the variation in such a way as not to be a specific polarization or phase condition where a signal to be amplified is close to zero.

16. The receiving method according to claim 15, further comprising
executing at least one of adjustment of a phase of the local oscillation light and polarization rotation of the optical signal in such a way as to optimize a predetermined indicator of reception quality of the optical signal.

17. The receiving method according to claim 16, further comprising
executing at least one of adjustment of a phase of the local oscillation light and polarization rotation of the optical signal in such a way as to minimize a number of errors detected during demodulation.

18. The receiving method according to claim 17, further comprising
executing at least one of adjustment of a phase of the local oscillation light and polarization rotation of the optical signal in such a way as to rotate a constellation of a signal during demodulation.

19. The receiving method according to claim 16, further comprising
executing at least one of adjustment of a phase of the local oscillation light and polarization rotation of the optical signal in such a way as to rotate a constellation of a signal during demodulation.

20. The receiving method according to claim 15, further comprising
executing at least one of adjustment of a phase of the local oscillation light and polarization rotation of the optical signal in such a way as to rotate a constellation of a signal during demodulation.

* * * * *